US010800314B2

(12) United States Patent
Saer

(10) Patent No.: US 10,800,314 B2
(45) Date of Patent: Oct. 13, 2020

(54) REMOVABLE CONTAINER SHIPPING SAFETY FRAME FOR VEHICLE

(71) Applicant: Matt Saer, Charleston, SC (US)

(72) Inventor: Matt Saer, Charleston, SC (US)

( * ) Notice: Subject to any disclaimer, the term of this patent is extended or adjusted under 35 U.S.C. 154(b) by 218 days.

(21) Appl. No.: 16/121,597

(22) Filed: Sep. 4, 2018

(65) Prior Publication Data

US 2020/0070710 A1 Mar. 5, 2020

(51) Int. Cl.
*B60P 3/07* (2006.01)
*B60P 3/075* (2006.01)
*B60P 7/15* (2006.01)
*B65D 85/68* (2006.01)
*B66D 3/20* (2006.01)

(52) U.S. Cl.
CPC ............. *B60P 3/075* (2013.01); *B60P 7/15* (2013.01); *B65D 85/68* (2013.01); *B66D 3/20* (2013.01); *B65D 2585/6867* (2013.01); *B66D 2700/0141* (2013.01)

(58) Field of Classification Search
CPC .... B60P 3/08; B60P 3/07; B60P 3/073; B60P 3/06; B60P 3/077
USPC ...... 410/11, 12, 23, 7, 8, 20, 97, 96, 85, 78; 414/498, 143.2, 345, 399, 400, 428; 206/335, 499, 577, 591, 600
See application file for complete search history.

(56) References Cited

U.S. PATENT DOCUMENTS

| 4,124,119 | A | | 11/1978 | Nordstrom | |
|---|---|---|---|---|---|
| 4,801,229 | A | * | 1/1989 | Hanada | B60P 3/08 410/26 |
| 4,954,038 | A | | 9/1990 | Sheahan | |
| 4,963,067 | A | | 10/1990 | Gearin et al. | |
| 5,286,149 | A | | 2/1994 | Seay et al. | |
| 5,454,672 | A | | 10/1995 | Halpin et al. | |
| 5,775,858 | A | | 7/1998 | Bacon | |
| 6,138,579 | A | * | 10/2000 | Khattab | B60P 3/08 105/355 |
| 6,814,529 | B2 | * | 11/2004 | Junge | B65D 19/44 206/335 |
| 6,890,134 | B1 | * | 5/2005 | Wagner | B23C 3/32 409/131 |
| 8,807,891 | B2 | | 8/2014 | Clive-Smith | |
| 9,809,144 | B2 | * | 11/2017 | Clive-Smith | B60P 3/08 |
| 2008/0008552 | A1 | | 1/2008 | Boydstun et al. | |
| 2018/0237216 | A1 | | 8/2018 | Saer | |

* cited by examiner

*Primary Examiner* — D Glenn Dayoan
*Assistant Examiner* — Sunsurraye Westbrook
(74) *Attorney, Agent, or Firm* — Singleton Law, PLLC; Chainey P. Singleton

(57) ABSTRACT

The present invention provides an automated removable frame system for transporting vehicles in a container. The frame system is be assembled in the container, the vehicles are loaded on the frame system, the container is shipped to the location, the vehicles are unloaded from the frame system, and the frame system is disassembled and returned to the manufacture or stored for later use.

20 Claims, 9 Drawing Sheets

REMOVABLE CONTAINER SHIPPING SAFETY FRAME FOR VEHICLE

CROSS-REFERENCE TO RELATED APPLICATIONS

None.

TECHNICAL FIELD OF THE INVENTION

The present invention relates in general to the field of transport systems, and more particularly, to collapsible transport systems incorporating safety measures for transporting vehicles.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with transport systems. Transport frame systems have been known in the art; however, given the unique requirements of securing a vehicle for transport, the known frame systems have serious limitations. For example, the frame system must be strong enough to support the weight of the vehicle and sturdy enough to maintain stability for the vehicle. In addition, there are different types of frame systems available, some systems are installed permanently in the container, while others are removably installed in the container. The removable systems are often heavy and difficult to pull the frames from the container. In addition, the positioning of the vehicle requires a crane like frame, electric motors and so on.

For example, U.S. Pat. No. 8,807,891 entitled, "Removable frame systems for vehicle shipping" discloses a frame system for supporting two wheels of an associated vehicle for transport within an existing transportable structure such as a standard ISO container which has longitudinally extending side structures. The frame system comprising a transverse wheel supporting frame supported by two vertical posts located one at each end of the wheel supporting frame. Each post is provided with attachment means for securing the top and bottom of the post at a plurality of locations along the length of the associated side structure independent of the shape of the side structure. The wheel supporting frame is raiseable with or without a vehicle loaded thereon and once raised is fixable to the posts at a chosen location for transport within the transportable structure. The attachment means may comprise ties of adjustable length which pull each post in the fore and aft direction relative to the side structure to locate each post.

For example, U.S. Pat. No. 6,287,061 entitled, "Flatbed vehicle transport system" discloses a flatbed vehicle transport system for of the support member, cross members and ramp members. The inventive device includes a plurality of support members that are positionable within apertures within a trailer, a plurality of cross members insertable into the support members, a plurality of ramp members attached across the cross members, and a loading ramp for loading vehicles upon the trailer. A plurality of chains are preferably secured to one or more support members to prevent longitudinal movement of the structure while loaded.

The entire contents of each of which are incorporated herein by reference.

SUMMARY OF THE INVENTION

The present invention provide a removable frame system for supporting a vehicle for transport comprising: a front lift station comprising a first front lift station opposite a second front lift station, wherein the first front lift station comprises a first front header and a first front footer separated by one or more first front support posts; and a first front winch attached to the first front lift station, and wherein the second front lift station comprises a second front header and a second front footer separated by one or more second front support posts; and a second front winch attached to the second front lift station; a front crossbeam system slidably connected to the first front lift station, wherein the front crossbeam system comprises a first front cross member connected to a second front cross member by a first front rail and a front second rail, wherein the first front cross member is retained and moves on the one or more first front support posts and the second front cross member is retained and moves on the one or more second front support posts; a first front winch cable operably connected to the first front winch and to the first front cross member; a second front winch cable operably connected to the second front winch and to the second front cross member to raise and lower the front crossbeam system; a first front vehicle adaptor spanning the first front rail and the second front rail; a second front vehicle adaptor spanning the first front rail and a second front rail; a rear lift station positioned adjacent the front lift station, wherein the rear lift station comprises a first rear lift station opposite a second rear lift station, wherein the first rear lift station comprises a first rear header and a first rear footer separated by one or more first rear support posts; and a first rear winch attached to the first rear lift station, and wherein the second rear lift station comprises a second rear header and a second rear footer separated by one or more second rear support posts; and a second rear winch attached to the second rear lift station; a rear crossbeam system slidably connected to the rear lift station, wherein the rear crossbeam system comprises a first rear cross member connected to a second rear cross member by a first rear rail and a second rear rail, wherein the first rear cross member is retained and moves on the one or more first rear support posts and the second rear cross member is retained and moves on the one or more second rear support posts; a first rear winch cable operably connected to the first rear winch and to the first rear cross member; a second rear winch cable operably connected to the second rear winch and to the second rear cross member to raise and lower the rear crossbeam system; a first rear vehicle adaptor spanning the first rear rail and the second rear rail; and a second rear vehicle adaptor spanning the first rear rail and the second rear rail.

The one or more first front support posts, one or more second front support posts, one or more first rear support posts, one or more second rear support posts may independently comprise a pair of support posts. The first front winch, the second front winch, the first rear winch, second rear winch may independently be connected to the header, the footer or the one or more support posts. The first front winch, the second front winch, the first rear winch, second rear winch may be independently remotely located. The removable frame system may include a control unit connected to the first front winch, the second front winch, the first rear winch, and the second rear winch to operably control the first front winch, the second front winch, the first rear winch, and the second rear winch independently, in pairs or in unison. The control unit may be connected wired, wirelessly or a combination thereof. The first front winch may be linked to move in unison with the second front winch. The first rear winch may be linked to move in unison with the second rear winch. The removable frame system may further comprise a power supply connected to the first front winch, the second front winch, the first rear winch, and the second rear winch. The removable frame system may further comprise a position sensor connected to the front crossbeam system, the rear crossbeam system or both to locate the position of the front crossbeam system, the rear crossbeam system or both. The removable frame system may further comprise a clearance sensor connected to the front lift station, the rear lift station or both to determine if the front crossbeam system, the rear crossbeam system or both are blocked. The removable frame system may further comprise a locking means connected to the first front lift station, the second front lift station, the first rear lift station, the second rear lift station or a combination thereof stop the downward motion of the front crossbeam system, the rear crossbeam system or both. The locking means may be connected to the control unit to selectable engage the locking means. The removable frame system may further comprise one or more pulleys attached to the first front lift station, one or more pulleys operably connected to the attached to the second front lift station, and/or one or more pulleys attached to the first rear lift station and one or more pulleys attached to the second rear header.

The present invention provides a method of transporting a vehicle comprising the steps of providing a container; installing a removable frame system for supporting a vehicle in the container, wherein the removable frame system comprises a front lift station comprising a first front lift station opposite a second front lift station, wherein the first front lift station comprises a first front header and a first front footer separated by one or more first front support posts; and a first front winch attached to the first front lift station, and wherein the second front lift station comprises a second front header and a second front footer separated by one or more second front support posts; and a second front winch attached to the second front lift station; a front crossbeam system slidably connected to the first front lift station, wherein the front crossbeam system comprises a first front cross member connected to a second front cross member by a first front rail and a front second rail, wherein the first front cross member is retained and moves on the one or more first front support posts and the second front cross member is retained and moves on the one or more second front support posts; a first front winch cable operably connected to the first front winch and to the first front cross member; a second front winch cable operably connected to the second front winch and to the second front cross member to raise and lower the front crossbeam system; a first front vehicle adaptor spanning the first front rail and the second front rail; a second front vehicle adaptor spanning the first front rail and a second front rail; a rear lift station positioned adjacent the front lift station, wherein the rear lift station comprises a first rear lift station opposite a second rear lift station, wherein the first rear lift station comprises a first rear header and a first rear footer separated by one or more first rear support posts; and a first rear winch attached to the first rear lift station, and wherein the second rear lift station comprises a second rear header and a second rear footer separated by one or more second rear support posts; and a second rear winch attached to the second rear lift station; a rear crossbeam system slidably connected to the rear lift station, wherein the rear crossbeam system comprises a first rear cross member connected to a second rear cross member by a first rear rail and a second rear rail, wherein the first rear cross member is retained and moves on the one or more first rear support posts and the second rear cross member is retained and moves on the one or more second rear support posts; a first rear winch cable operably connected to the first rear winch and to the first rear cross member; a second rear winch cable operably connected to the second rear winch and to the second rear cross member to raise and lower the rear crossbeam system; a first rear vehicle adaptor spanning the first rear rail and the second rear rail; and a second rear vehicle adaptor spanning the first rear rail and the second rear rail; connecting a power supply to the first front winch, the second front winch, the first rear winch, and the second rear winch; connecting a control unit to the power supply to control the first front winch, the second front winch, the first rear winch, and the second rear winch; inserting a first vehicle into the container, wherein the vehicle comprises a vehicle front and a vehicle rear; positioning the vehicle front on the first front vehicle adaptor and the second front vehicle adaptor; positioning the vehicle rear on the first rear vehicle adaptor and the second rear vehicle adaptor; engaging the control unit to operate the first front winch and the second front winch to raise the vehicle front; engaging the control unit to operate the first rear winch and the second rear winch to raise the vehicle rear; wherein the location of the vehicle front relative to the vehicle rear form a lift angle of between 0 and 85 degrees. The method may further comprise the steps of locking the front crossbeam system and the rear crossbeam system in position. The front cross member may be is parallel to the rear cross member or the front cross member may be at an angle of between 25 and 90 degrees relative to the rear cross member, e.g., 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90 or incremental variations thereof. The container may be simple container, cargo container, freight container, ISO container, shipping container, sea container, ocean container, container van, CONES® box, sea box, c can, a 53-foot container, intermodal container, or similar container.

The present invention provides a method of retrofitting a vehicle transport system comprising the steps of providing a front lift station comprising a first front lift station opposite a second front lift station, wherein the first front lift station comprises a first front header and a first front footer separated by one or more first front support posts; connecting a first front winch to the first front lift station; providing a second front lift station comprises a second front header and a second front footer separated by one or more second front support posts; connecting a second front winch to the second front lift station; providing a front crossbeam system slidably connected to the first front lift station and the second front lift station; connecting a first front winch cable from the first front winch to the front crossbeam system; connecting a second front winch cable from the second front winch to the front crossbeam system; providing a rear lift station comprising a first rear lift station opposite a second rear lift station wherein the first rear lift station comprises a first rear header and a first rear footer separated by one or more first rear support posts; connecting a first rear winch to the first rear lift station; providing a second rear lift station comprises a second rear header and a second rear footer separated by one or more second rear support posts; connecting a second rear winch to the second rear lift station; providing a rear crossbeam system slidably connected to the first rear lift station and the second rear lift station; connecting a first rear winch cable from the first rear winch to the rear crossbeam system; connecting a second rear winch cable from the second rear winch to the rear crossbeam system; connecting a power supply to the first front winch, the second front winch, the first rear winch, and the second rear winch to operably control the first front winch, the second front winch, the first rear winch, and the second rear winch; connecting a control unit to the power supply; connecting the control unit to the first front winch, the second front winch, the first rear winch, and the second rear winch to operably control the first front winch, the second front winch, the first rear winch, and the second rear winch independently, in pairs or in unison, wherein the control unit is wireless, wired or a combination of wired and wireless; optionally connecting the control unit to one or more sensors; and optionally providing one or more rear vehicle adaptors spanning the front crossbeam system and one or more rear vehicle adaptors spanning the area crossbeam system.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "container" denotes a simple container, cargo or freight container, ISO container, shipping, sea or ocean container, container van or (CONEX®) box, sea or c can. Furthermore, the term may include a trailer (i.e., a 53-foot container, intermodal container, etc.).

The present Inventors recognized the need for a frame system that is sturdy and light weight but is easily installable and removeable from the container so that the container can be used to transport other goods on its return journey. The frame system must also be capable of holding the vehicle securely in its raised transport position and handle the vertical and horizontal stresses as the container moves. The frame system must allow adjustments of the position of the vehicles within the container to maximize space.

The present invention provides an automated modular rack system designed to be removably fitted into a shipping container. However, the present invention could be used in any enclosure, e.g., garage, storage unit, warehouse (e.g., commercial, business or personal), storage facility (e.g., commercial, business or personal), dock (for boat storage, jet ski storage, or water craft storage) and so forth. The present invention may even be used by attaching the device to a floor and/or one or more walls, e.g., beside a building or the like.

The automated modular rack system of the present invention includes a pair of front lift stations and a pair of rear lift stations. Each of the pair of front lift stations and the pair of rear lift stations include a left and right lift station. In one embodiment, each lift station is identical and interchangeable.

Figure 1:
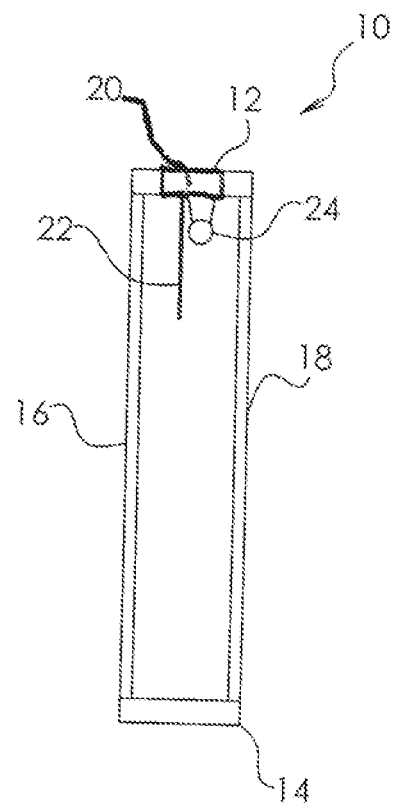
FIG. 1 is an image illustrating a pair of lift stations.
Figure 1:
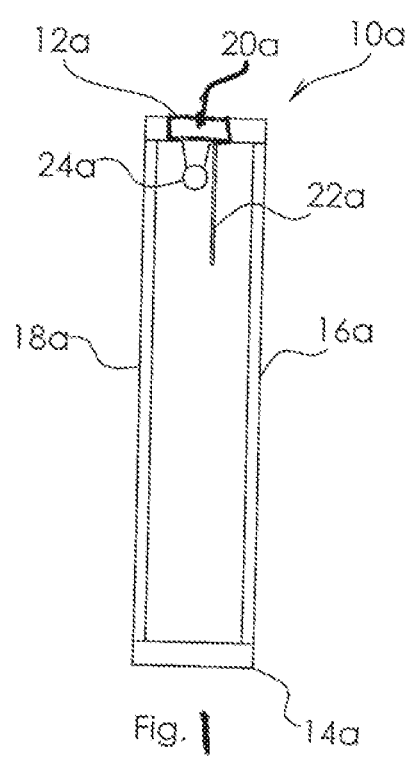

FIG. 1 is an image illustrating a pair of lift stations. The pair of lift stations may be the pair of front lift stations or the pair of rear lift stations as they are identical. As the lift station may be either the front or rear lift station they will be described in terms of left and right to equally apply to the front or rear lift station. The right lift station 10 includes a right header 12 and a right footer 14 separated by a first post 16 and a second post 18. The right header 12 and the right footer 14 may be attached to the first post 16 and a second post 18 by any means known to the skilled artisan. This includes connecting the right header 12 and the right footer 14 may be attached to the first post 16 and a second post 18 with fasteners, removable bolts and nuts, pins, dowels, and the like. In another embodiment, the right header 12 and the right footer 14 may be attached to the first post 16 and a second post 18 may be frictionally fitted together in a locking manner that does not require fasteners. This includes a slot groove configuration or fitting the component into an aperture. In operation, the right header 12 and the first footer are inserted into a slot on the first post 16 and a second post 18 to secure the components. In another embodiment, the right header 12 and the right footer 14 have apertures that are adapted to fit the first post 16 and a second post 18 and mate to a tab or groove secure the components, fasteners may optionally be used. In addition, the right footer 14 may include an extension extending parallel to the floor to increase the contact area of the right footer 14 and the floor to increase stability. The right header 12 and the right footer 14 can be used to set the width separating the first post 16 and a second post 18 of the lift station 10 depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the right header 12 may be attached to the container sidewall (not shown) or the container ceiling (not shown). The right footer 14 may be connected to the container sidewall (not shown) or the container floor (not shown). In some embodiments the right header 12 may be connected to the container sidewall and the right footer 14 is connected to the container floor. A right header winch 20 is attached to header 12 such that the right winch cable 22 may extend towards the footer 14. The right header winch 20 may be attached to the right header 12 directly or may be attached to a removable mounting plate that connects to the right header 12. The right header winch 20 includes a right winch cable 22 that extends toward the right footer 14. In an alternate embodiment the winch may be attached to the footer, the post or attached remotely and connected by a cable. A right header pulley 24 may be optionally attached to the right header 12 to allow the right winch cable 22 greater lifting and lowering capacity. The left lift station 10a includes a left header 12a and a left footer 14a separated by a first post 16a and a second post 18a. The left header 12a and the left footer 14a may be attached to the first post 16a and a second post 18a by any means known to the skilled artisan. This includes connecting the left header 12a and the left footer 14a may be attached to the first post 16a and a second post 18a with fasteners, removable bolts and nuts, pins, dowels, and the like. In another embodiment, the left header 12a and the left footer 14a may be attached to the first post 16a and a second post 18a may be frictionally fitted together in a locking manner that does not require fasteners. This includes a slot groove configuration or fitting the component into an aperture. In operation, the left header 12a and the left footer 14a are inserted into a slot on the first post 16a and a second post 18a to secure the components. In another embodiment, the left header 12a and the left footer 14a have apertures that are adapted to fit the first post 16a and a second post 18a and mate to a tab or a groove secure the components, fasteners may optionally be used. In addition, the left footer 14a may include an extension extending parallel to the floor to increase the contact area of the left footer 14a and the floor to increase stability. The left header 12a and the left footer 14a can be used to set the width separating the first post 16a and a second post 18a of the left lift station 10a depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the left header 12a may be attached to the container sidewall (not shown) or the container ceiling (not shown). The left footer 14a may be connected to the container sidewall (not shown) or the container floor (not shown). In some embodiments the left header 12a may be connected to the container sidewall and the left footer 14a is connected to the container floor. A left header winch 20a is attached to left header 12a such that the left winch cable 22a may extend towards the left footer 14a. The left header winch 20a may be attached to the left header 12a directly or may be attached to a removable mounting plate that connects to the left header 12a. The left header winch 20a includes a left winch cable 22a that extends toward the left footer 14a. A left header pulley 24a may be optionally attached to the left header 12a to allow the left winch cable 22a greater lifting and lowering capacity.

Figure 2A:
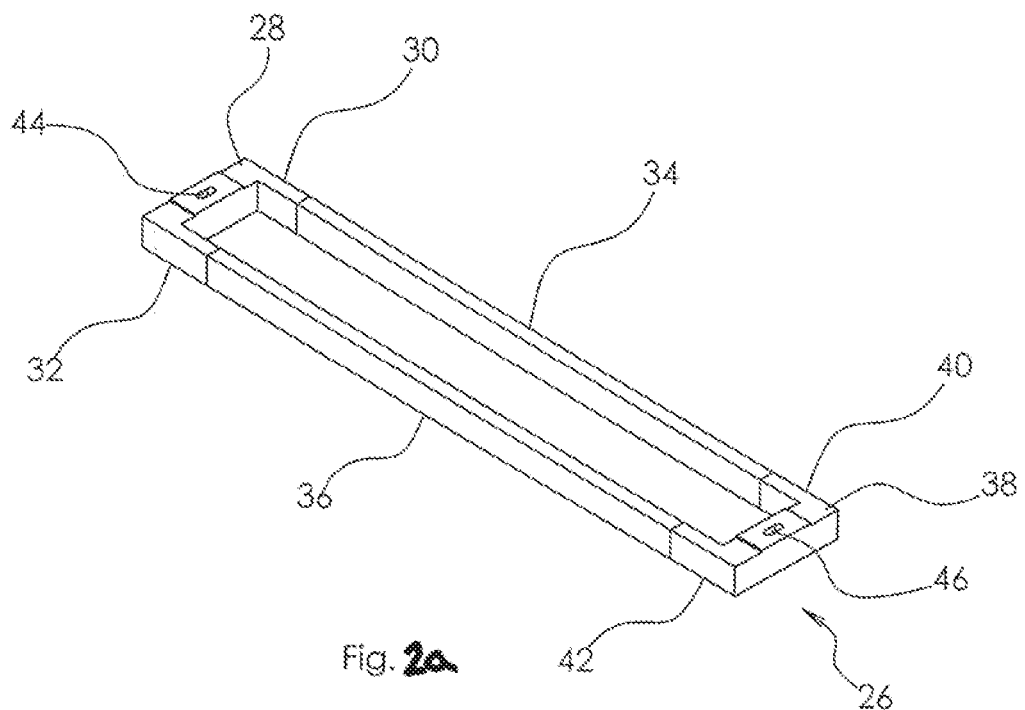
FIGS. 2a and 2b are images illustrating the crossbeam system that spans from the left lift station to the right lift station.
Figure 2B:
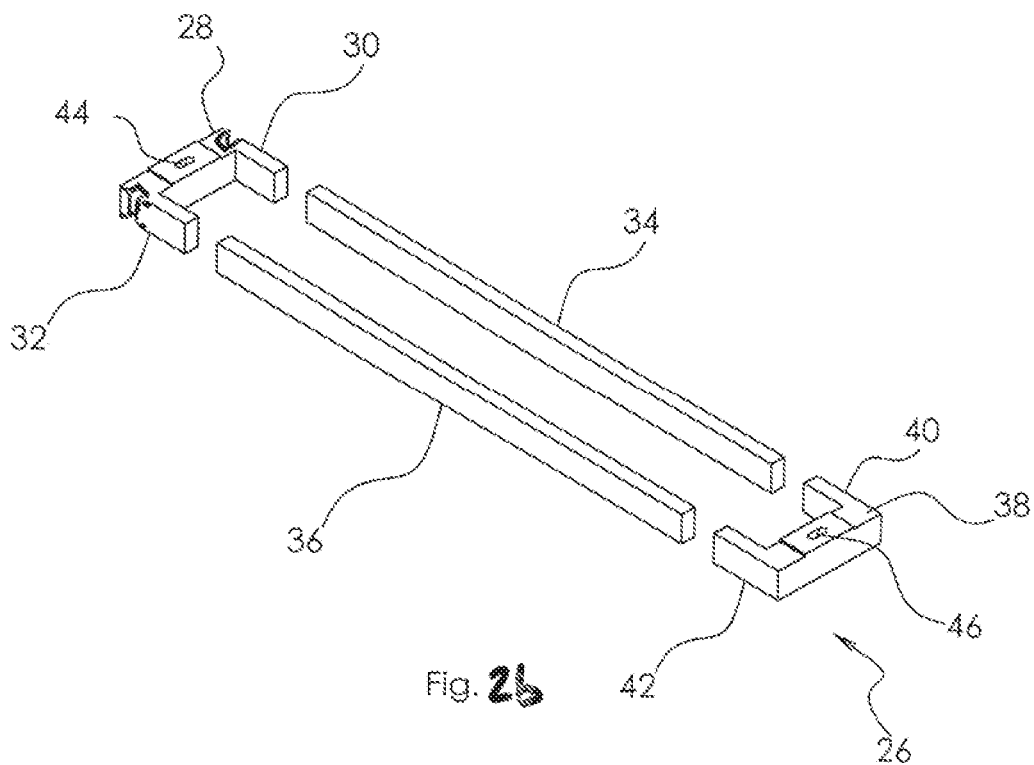

FIGS. 2a and 2b are images illustrating the crossbeam system that spans from the left lift station to the right lift station. The crossbeam system may be used in conjunction with a pair of lift stations and apply equally to the pair of front lift stations or the pair of rear lift stations as they are identical. The crossbeam system 26 includes a right cross member 28 having a first extension 30 and a second extension 32. A first rail 34 connects to the first extension 30 and a second rail 36 connects to the second extension 32. A left cross member 38 includes a first extension 40 and a second extension 42 such that the first extension 40 connects to the first rail 34 and the second extension 42 connects to the second rail 36. The connection includes a slip fitting of one member within the other member and can be configured as the extension fitting into the rail or the rail fitting into the extension. The first rail 34 and the second rail 36 may include a plethora of apertures capable of receiving one or more retaining mechanisms. The first extension 30, the second extension 32, the first extension 40 and the second extension 42 may include apertures that align with apertures the first rail 34 and the second rail 36 to accept one or more fasteners. In other embodiments, the first extension 30, the second extension 32, the first extension 40 and the second extension 42 may be frictionally fitted inside the first rail 34 and the second rail 36 or the first rail 34 and the second rail 36 may be fitted inside the first extension 30, the second extension 32 the first extension 40, and the second extension 42. In yet another embodiment, the first extension 30, the second extension 32, the first extension 40 and the second extension 42 may be permanently attached to the first rail 34 and the second rail 36. The right cross member 28 includes a right attachment point 44 and the left cross member 38 includes a left attachment point 46. The right attachment 44 and the left attachment 46 may be connected to a pulley (not shown) or directly to the right winch cable and left winch cable respectively. The right cross member 28 is configured to slidably engage the first post 16 and the second post 18 to allow the right cross member 28 to slide from the right footer 14 to the right header 12. This engagement mechanism may include rollers, tracks, bushing, slide plates, bushings or any other mechanism to allow the movement of the right cross member 28 up and down on the first post 16 and the second post 18. In addition, the first post 16 and the second post 18 may each include a plethora of apertures positioned from the right header 12 to the right footer 14 to receive a securing mechanism to limit the motion of the right cross member 28 when the final position is achieved. In addition, the right cross member 28 may include one or more apertures that align with the plethora of apertures to secure the right cross member 28 at a specific location on the first post 16 and the second post 18. The left cross member 38 is configured to slidably engage the first post 16a and the second post 18a to allow the left cross member 38 to slide from the left footer 14a to the left header 12a. In addition, the first post 16a and the second post 18a may each include a plethora of apertures positioned from the left header 12a to the left footer 14a to receive a securing mechanism to limit the motion of the left cross member 38 when the final position is achieved. In addition, the left cross member 38 may include one or more apertures that align with the plethora of apertures to secure the left cross member 38 at a specific location on the first post 16a and the second post 18a.

Figure 3:
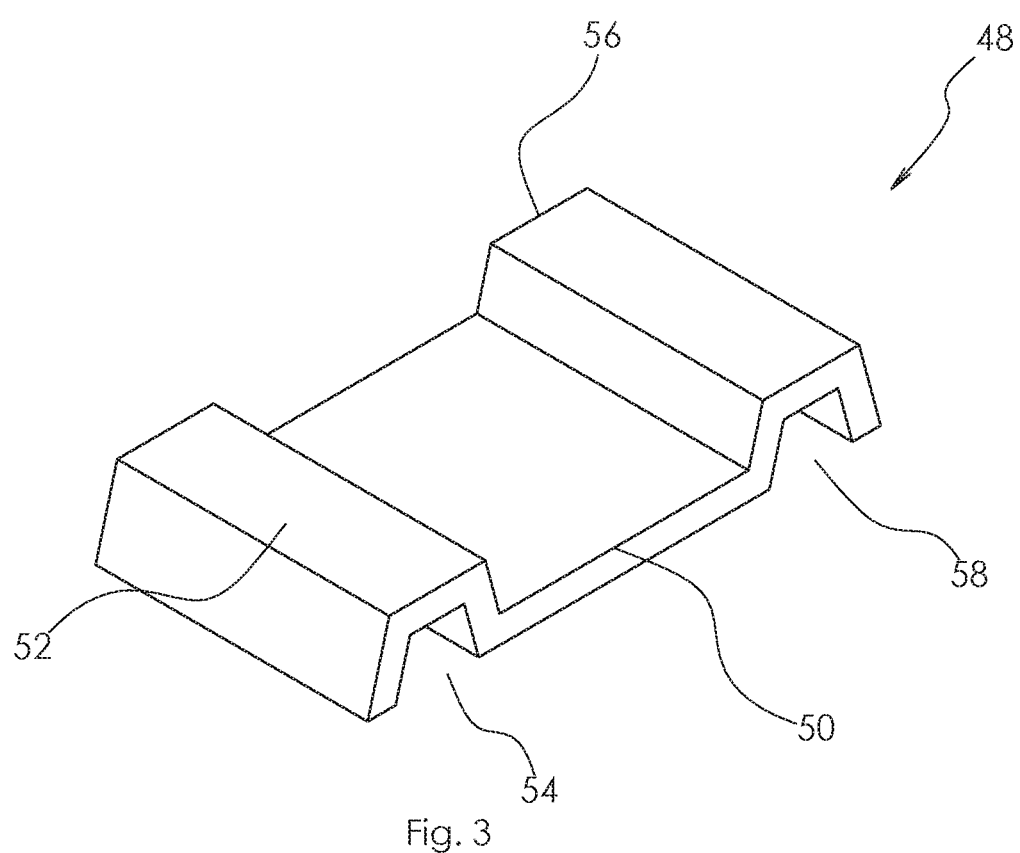
FIG. 3 is an image of the vehicle adapter adapted to fit the pair of lift stations.

FIG. 3 is an image of the vehicle adapter adapted to fit the pair of lift stations. The vehicle adapter 56 is configured to interact with first rail 34 and second rail 36. The vehicle adapter 56 includes a first region 50 separating a first rail attachment region 52 that includes a first channel 54 adapted to mate to the first rail 34 and a second rail attachment region 56 that includes a second channel 58 adapted to mate to the second rail 36. In operation, the vehicle adapter 56 will be used in pairs to accommodate a vehicle (not shown). The vehicle adapter 56 can be configured for specific types of vehicles, e.g. car, truck, boat, watercraft, motorcycle, or the like. Although, it is common to transport motor vehicles, the present invention includes vehicle adaptors that can accommodate other vehicles including boats (boat adaptors), snowmobiles (snowmobile adaptors), trailers (trailer adaptors), watercraft (jet ski adaptors), air planes (air plane adaptors), ATVs (ATV adaptors), and anything that will fit within the container (miscellaneous adaptors). For example, a boat adaptor would have a profile to mate to the hull of the boat. When the vehicle (not shown) is an automobile, the vehicle adapter 56 will be used in pairs and spaced along the first rail 34 and the second rail 36 to accommodate the wheel spacing of the vehicle (not shown).

Figure 4:
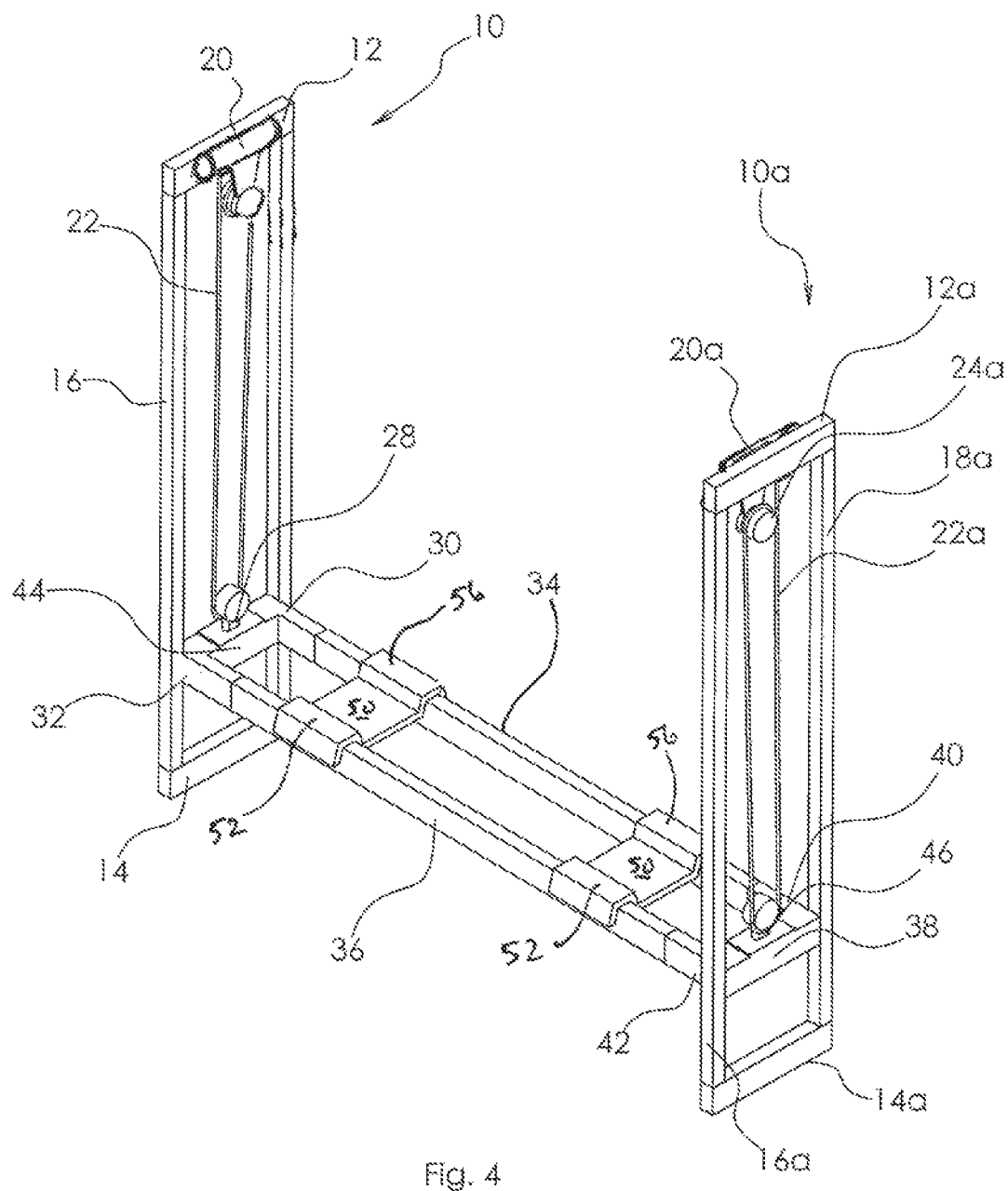
FIG. 4 is a perspective view of a pair left and right lift stations.

FIG. 4 is a perspective view of a pair left and right lift stations. The pair of lift stations may be the pair of front lift stations or the pair of rear lift stations as they are identical. As the lift station may be either the front or rear lift station they will be described in terms of left and right to equally apply to the front or rear lift station. The right lift station 10 includes a right header 12 and a right footer 14 separated by a first post 16 and a second post 18. The right header 12 and the right footer 14 may be attached to the first post 16 and a second post 18 by any means known to the skilled artisan. This includes connecting the right header 12 and the right footer 14 may be attached to the first post 16 and a second post 18 with fasteners, removable bolts and nuts, pins, dowels, and the like. In another embodiment, the right header 12 and the right footer 14 may be attached to the first post 16 and a second post 18 may be frictionally fitted together in a locking manner that does not require fasteners. This includes a slot groove configuration or fitting the component into an aperture. In operation, the right header 12 and the first footer are inserted into a slot on the first post 16 and a second post 18 to secure the components. In another embodiment, the right header 12 and the right footer 14 have apertures that are adapted to fit the first post 16 and a second post 18 and mate to a tab or groove secure the components, fasteners may optionally be used. In addition, the right footer 14 may include an extension extending parallel to the floor to increase the contact area of the right footer 14 and the floor to increase stability. The right header 12 and the right footer 14 can be used to set the width separating the first post 16 and a second post 18 of the lift station 10 depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the right header 12 may be attached to the container sidewall (not shown) or the container ceiling (not shown). The right footer 14 may be connected to the container sidewall (not shown) or the container floor (not shown). In some embodiments the right header 12 may be connected to the container sidewall and the right footer 14 is connected to the container floor. A right header winch 20 is attached to header 12 such that the right winch cable 22 may extend towards the footer 14. The right header winch 20 may be attached to the right header 12 directly or may be attached to a removable mounting plate that connects to the right header 12. The right header winch 20 includes a right winch cable 22 that extends toward the right footer 14. A right header pulley 24 may be optionally attached to the right header 12 to allow the right winch cable 22 greater lifting and lowering capacity. The left lift station 10a includes a left header 12a and a left footer 14a separated by a first post 16a and a second post 18a. The left header 12a and the left footer 14a may be attached to the first post 16a and a second post 18a by any means known to the skilled artisan. This includes connecting the left header 12a and the left footer 14a may be attached to the first post 16a and a second post 18a with fasteners, removable bolts and nuts, pins, dowels, and the like. In another embodiment, the left header 12a and the left footer 14a may be attached to the first post 16a and a second post 18a may be frictionally fitted together in a locking manner that does not require fasteners. This includes a slot groove configuration or fitting the component into an aperture. In operation, the left header 12a and the left footer 14a are inserted into a slot on the first post 16a and a second post 18a to secure the components. In another embodiment, the left header 12a and the left footer 14a have apertures that are adapted to fit the first post 16a and a second post 18a and mate to a tab or a groove secure the components, fasteners may optionally be used. In addition, the left footer 14a may include an extension extending parallel to the floor to increase the contact area of the left footer 14a and the floor to increase stability. The left header 12a and the left footer 14a can be used to set the width separating the first post 16a and a second post 18a of the left lift station 10a depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the left header 12a may be attached to the container sidewall (not shown) or the container ceiling (not shown). The left footer 14a may be connected to the container sidewall (not shown) or the container floor (not shown). In some embodiments the left header 12a may be connected to the container sidewall and the left footer 14a is connected to the container floor. A left header winch 20a is attached to left header 12a such that the left winch cable 22a may extend towards the left footer 14a. The left header winch 20a may be attached to the left header 12a directly or may be attached to a removable mounting plate that connects to the left header 12a. The left header winch 20a includes a left winch cable 22a that extends toward the left footer 14a. A left header pulley 24a may be optionally attached to the left header 12a to allow the left winch cable 22a greater lifting and lowering capacity. The crossbeam system 26 includes a right cross member 28 having a first extension 30 and a second extension 32. A first rail 34 connects to the first extension 30 and a second rail 36 connects to the second extension 32. A left cross member 38 includes a first extension 40 and a second extension 42 such that the first extension 40 connects to the first rail 34 and the second extension 42 connects to the second rail 36. The connection includes a slip fitting of one member within the other member and can be configured as the extension fitting into the rail or the rail fitting into the extension. The first rail 34 and the second rail 36 may include a plethora of apertures capable of receiving one or more retaining mechanisms. The first extension 30, the second extension 32, the first extension 40 and the second extension 42 may include apertures that align with apertures the first rail 34 and the second rail 36 to accept one or more fasteners. In other embodiments, the first extension 30, the second extension 32, the first extension 40 and the second extension 42 may be frictionally fitted inside the first rail 34 and the second rail 36 or the first rail 34 and the second rail 36 may be fitted inside the first extension 30, the second extension 32 the first extension 40, and the second extension 42. In yet another embodiment, the first extension 30, the second extension 32, the first extension 40 and the second extension 42 may be permanently attached to the first rail 34 and the second rail 36. The right cross member 28 includes a right attachment point 44 and the left cross member 38 includes a left attachment point 46. The right attachment 44 and the left attachment 46 may be connected to a pulley (not shown) or directly to the right winch cable and left winch cable respectively. The right cross member 28 is configured to slidably engage the first post 16 and the second post 18 to allow the right cross member 28 to slide from the right footer 14 to the right header 12. In some embodiments, the right winch cable 22 is directly connected to the right cross member 28. In other embodiments, one or more pulleys are used to amplify the force. In these instances a first pulley may be attached to the right header 12, the right cross member 28 or both the first header 12 and the right cross member 28. Similarly, the left winch cable 22a is directly connected to the left cross member 38. In other embodiments, one or more pulleys are used to amplify the force. In these instances a first pulley may be attached to the left header 12a, the left cross member 38 or both the first header 12 and the left cross member 38. This engagement mechanism may include rollers, tracks, bushing, slide plates, bushings or any other mechanism to allow the movement of the right cross member 28 up and down on the first post 16 and the second post 18. In addition, the first post 16 and the second post 18 may each include a plethora of apertures positioned from the right header 12 to the right footer 14 to receive a securing mechanism to limit the motion of the right cross member 28 when the final position is achieved. In addition, the right cross member 28 may include one or more apertures that align with the plethora of apertures to secure the right cross member 28 at a specific location on the first post 16 and the second post 18. The left cross member 38 is configured to slidably engage the first post 16a and the second post 18a to allow the left cross member 38 to slide from the left footer 14a to the left header 12a. In addition, the first post 16a and the second post 18a may each include a plethora of apertures positioned from the left header 12a to the left footer 14a to receive a securing mechanism to limit the motion of the left cross member 38 when the final position is achieved. In addition, the left cross member 38 may include one or more apertures that align with the plethora of apertures to secure the left cross member 38 at a specific location on the first post 16a and the second post 18a. The vehicle adapter 56 is configured to interact with first rail 34 and second rail 36. The vehicle adapter 56 includes a first region 50 separating a first rail attachment region 52 that includes a first channel 54 adapted to mate to the first rail 34 and a second rail attachment region 56 that includes a second channel 58 adapted to mate to the second rail 36. In operation, the vehicle adapter 56 will be used in pairs to accommodate a vehicle (not shown). The vehicle adapter 56 can be configured for specific types of vehicles, e.g. car, truck, boat, watercraft, motorcycle, or the like. When the vehicle (not shown) is an automobile, the vehicle adapter 56 will be used in pairs and spaced along the first rail 34 and the second rail 36 to accommodate the wheel spacing of the vehicle (not shown).

Figure 5:
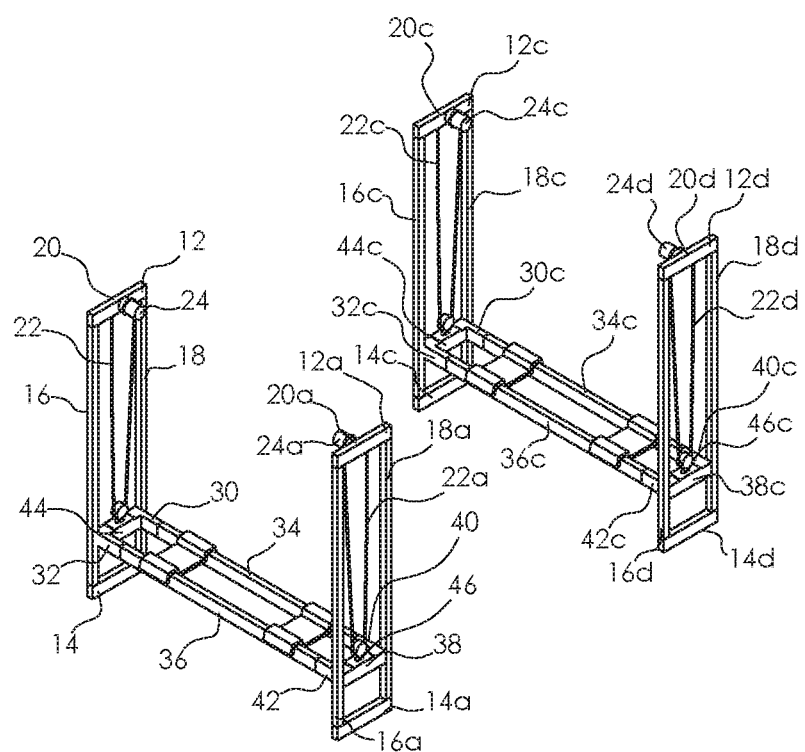
FIG. 5 is a perspective view of a front lift station having a left and right lift station and a rear lift station having a left and right lift station.

FIG. 5 is a perspective view of a front lift station having a left and right lift station and a rear lift station having a left and right lift station. The front lift station 60 includes the right lift station 10 includes a right header 12 and a right footer 14 separated by a first post 16 and a second post 18. The right header 12 and the right footer 14 may be attached to the first post 16 and a second post 18 by any means known to the skilled artisan. This includes connecting the right header 12 and the right footer 14 may be attached to the first post 16 and a second post 18 with fasteners, removable bolts and nuts, pins, dowels, and the like. In another embodiment, the right header 12 and the right footer 14 may be attached to the first post 16 and a second post 18 may be frictionally fitted together in a locking manner that does not require fasteners. This includes a slot groove configuration or fitting the component into an aperture. In operation, the right header 12 and the first footer are inserted into a slot on the first post 16 and a second post 18 to secure the components. In another embodiment, the right header 12 and the right footer 14 have apertures that are adapted to fit the first post 16 and a second post 18 and mate to a tab or groove secure the components, fasteners may optionally be used. In addition, the right footer 14 may include an extension extending parallel to the floor to increase the contact area of the right footer 14 and the floor to increase stability. The right header 12 and the right footer 14 can be used to set the width separating the first post 16 and a second post 18 of the lift station 10 depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the right header 12 may be attached to the container sidewall (not shown) or the container ceiling (not shown). The right footer 14 may be connected to the container sidewall (not shown) or the container floor (not shown). In some embodiments the right header 12 may be connected to the container sidewall and the right footer 14 is connected to the container floor. A right header winch 20 is attached to header 12 such that the right winch cable 22 may extend towards the footer 14. The right header winch 20 may be attached to the right header 12 directly or may be attached to a removable mounting plate that connects to the right header 12. The right header winch 20 includes a right winch cable 22 that extends toward the right footer 14. A right header pulley 24 may be optionally attached to the right header 12 to allow the right winch cable 22 greater lifting and lowering capacity. The left lift station 10a includes a left header 12a and a left footer 14a separated by a first post 16a and a second post 18a. The left header 12a and the left footer 14a may be attached to the first post 16a and a second post 18a by any means known to the skilled artisan. This includes connecting the left header 12a and the left footer 14a may be attached to the first post 16a and a second post 18a with fasteners, removable bolts and nuts, pins, dowels, and the like. In another embodiment, the left header 12a and the left footer 14a may be attached to the first post 16a and a second post 18a may be frictionally fitted together in a locking manner that does not require fasteners. This includes a slot groove configuration or fitting the component into an aperture. In operation, the left header 12a and the left footer 14a are inserted into a slot on the first post 16a and a second post 18a to secure the components. In another embodiment, the left header 12a and the left footer 14a have apertures that are adapted to fit the first post 16a and a second post 18a and mate to a tab or a groove secure the components, fasteners may optionally be used. In addition, the left footer 14a may include an extension extending parallel to the floor to increase the contact area of the left footer 14a and the floor to increase stability. The left header 12a and the left footer 14a can be used to set the width separating the first post 16a and a second post 18a of the left lift station 10a depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the left header 12a may be attached to the container sidewall (not shown) or the container ceiling (not shown). The left footer 14a may be connected to the container sidewall (not shown) or the container floor (not shown). In some embodiments the left header 12a may be connected to the container sidewall and the left footer 14a is connected to the container floor. A left header winch 20a is attached to left header 12a such that the left winch cable 22a may extend towards the left footer 14a. The left header winch 20a may be attached to the left header 12a directly or may be attached to a removable mounting plate that connects to the left header 12a. The left header winch 20a includes a left winch cable 22a that extends toward the left footer 14a. A left header pulley 24a may be optionally attached to the left header 12a to allow the left winch cable 22a greater lifting and lowering capacity. The crossbeam system 26 includes a right cross member 28 having a first extension 30 and a second extension 32. A first rail 34 connects to the first extension 30 and a second rail 36 connects to the second extension 32. A left cross member 38 includes a first extension 40 and a second extension 42 such that the first extension 40 connects to the first rail 34 and the second extension 42 connects to the second rail 36. The connection includes a slip fitting of one member within the other member and can be configured as the extension fitting into the rail or the rail fitting into the extension. The first rail 34 and the second rail 36 may include a plethora of apertures capable of receiving one or more retaining mechanisms. The first extension 30, the second extension 32, the first extension 40 and the second extension 42 may include apertures that align with apertures the first rail 34 and the second rail 36 to accept one or more fasteners. In other embodiments, the first extension 30, the second extension 32, the first extension 40 and the second extension 42 may be frictionally fitted inside the first rail 34 and the second rail 36 or the first rail 34 and the second rail 36 may be fitted inside the first extension 30, the second extension 32 the first extension 40, and the second extension 42. In yet another embodiment, the first extension 30, the second extension 32, the first extension 40 and the second extension 42 may be permanently attached to the first rail 34 and the second rail 36. The right cross member 28 includes a right attachment point 44 and the left cross member 38 includes a left attachment point 46. The right attachment 44 and the left attachment 46 may be connected to a pulley (not shown) or directly to the right winch cable and left winch cable respectively. The right cross member 28 is configured to slidably engage the first post 16 and the second post 18 to allow the right cross member 28 to slide from the right footer 14 to the right header 12. In some embodiments, the right winch cable 22 is directly connected to the right cross member 28. In other embodiments, one or more pulleys are used to amplify the force. In these instances a first pulley may be attached to the right header 12, the right cross member 28 or both the first header 12 and the right cross member 28. Similarly, the left winch cable 22a is directly connected to the left cross member 38. In other embodiments, one or more pulleys are used to amplify the force. In these instances a first pulley may be attached to the left header 12a, the left cross member 38 or both the first header 12 and the left cross member 38. This engagement mechanism may include rollers, tracks, bushing, slide plates, bushings or any other mechanism to allow the movement of the right cross member 28 up and down on the first post 16 and the second post 18. In addition, the first post 16 and the second post 18 may each include a plethora of apertures positioned from the right header 12 to the right footer 14 to receive a securing mechanism to limit the motion of the right cross member 28 when the final position is achieved. In addition, the right cross member 28 may include one or more apertures that align with the plethora of apertures to secure the right cross member 28 at a specific location on the first post 16 and the second post 18. The left cross member 38 is configured to slidably engage the first post 16a and the second post 18a to allow the left cross member 38 to slide from the left footer 14a to the left header 12a. In addition, the first post 16a and the second post 18a may each include a plethora of apertures positioned from the left header 12a to the left footer 14a to receive a securing mechanism to limit the motion of the left cross member 38 when the final position is achieved. In addition, the left cross member 38 may include one or more apertures that align with the plethora of apertures to secure the left cross member 38 at a specific location on the first post 16a and the second post 18a. The vehicle adapter 56 is configured to interact with first rail 34 and second rail 36. The vehicle adapter 56 includes a first region 50 separating a first rail attachment region 52 that includes a first channel 54 adapted to mate to the first rail 34 and a second rail attachment region 56 that includes a second channel 58 adapted to mate to the second rail 36. In operation, the vehicle adapter 56 will be used in pairs to accommodate a vehicle (not shown). The vehicle adapter 56 can be configured for specific types of vehicles, e.g. car, truck, boat, watercraft, motorcycle, or the like. When the vehicle (not shown) is an automobile, the vehicle adapter 56 will be used in pairs and spaced along the first rail 34 and the second rail 36 to accommodate the wheel spacing of the vehicle (not shown).

The rear lift station 62 includes the right lift station 10c includes a right header 12c and a right footer 14c separated by a first post 16c and a second post 18c. The right header 12c and the right footer 14c may be attached to the first post 16c and a second post 18c by any means known to the skilled artisan. This includes connecting the right header 12c and the right footer 14c may be attached to the first post 16c and a second post 18c with fasteners, removable bolts and nuts, pins, dowels, and the like. In another embodiment, the right header 12c and the right footer 14c may be attached to the first post 16c and a second post 18c may be frictionally fitted together in a locking manner that does not require fasteners. This includes a slot groove configuration or fitting the component into an aperture. In operation, the right header 12c and the first footer 14c are inserted into a slot on the first post 16c and a second post 18c to secure the components. In another embodiment, the right header 12c and the right footer 14c have apertures that are adapted to fit the first post 16c and a second post 18c and mate to a tab or groove secure the components, fasteners may optionally be used. In addition, the right footer 14c may include an extension extending parallel to the floor to increase the contact area of the right footer 14c and the floor to increase stability. The right header 12c and the right footer 14c can be used to set the width separating the first post 16c and a second post 18c of the lift station 10c depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12c and the right footer 14c can be used to set the width separating first post 16c and second post 18c and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the right header 12c may be attached to the container sidewall (not shown) or the container ceiling (not shown). The right footer 14c may be connected to the container sidewall (not shown) or the container floor (not shown). In some embodiments the right header 12c may be connected to the container sidewall and the right footer 14c is connected to the container floor. A right header winch 20c is attached to header 12c such that the right winch cable 22c may extend towards the footer 14c. The right header winch 20c may be attached to the right header 12c directly or may be attached to a removable mounting plate that connects to the right header 12c. The right header winch 20c includes a right winch cable 22c that extends toward the right footer 14c. A right header pulley 24c may be optionally attached to the right header 12c to allow the right winch cable 22c greater lifting and lowering capacity. The left lift station 10d includes a left header 12d and a left footer 14d separated by a first post 16d and a second post 18d. The left header 12d and the left footer 14d may be attached to the first post 16d and a second post 18d by any means known to the skilled artisan. This includes connecting the left header 12d and the left footer 14d may be attached to the first post 16d and a second post 18d with fasteners, removable bolts and nuts, pins, dowels, and the like. In another embodiment, the left header 12a and the left footer 14a may be attached to the first post 16d and a second post 18d may be frictionally fitted together in a locking manner that does not require fasteners. This includes a slot groove configuration or fitting the component into an aperture. In operation, the left header 12d and the left footer 14d are inserted into a slot on the first post 16d and a second post 18d to secure the components. In another embodiment, the left header 12d and the left footer 14d have apertures that are adapted to fit the first post 16d and a second post 18d and mate to a tab or a groove secure the components, fasteners may optionally be used. In addition, the left footer 14d may include an extension extending parallel to the floor to increase the contact area of the left footer 14d and the floor to increase stability. The left header 12d and the left footer 14d can be used to set the width separating the first post 16d and a second post 18d of the left lift station 10d depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The left header 12d and the left footer 14d can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the left header 12d may be attached to the container sidewall (not shown) or the container ceiling (not shown). The left footer 14d may be connected to the container sidewall (not shown) or the container floor (not shown). In some embodiments the left header 12d may be connected to the container sidewall and the left footer 14d is connected to the container floor. A left header winch 20d is attached to left header 12d such that the left winch cable 22d may extend towards the left footer 14d. The left header winch 20d may be attached to the left header 12d directly or may be attached to a removable mounting plate that connects to the left header 12d. The left winch 20d includes a left winch cable 22d that extends toward the left footer 14d. A left header pulley 24d may be optionally attached to the left header 12d to allow the left winch cable 22d greater lifting and lowering capacity. The crossbeam system 26 includes a right cross member 28 having a first extension 30 and a second extension 32. A first rail 34 connects to the first extension 30 and a second rail 36 connects to the second extension 32. A left cross member 38 includes a first extension 40 and a second extension 42 such that the first extension 40 connects to the first rail 34 and the second extension 42 connects to the second rail 36. The connection includes a slip fitting of one member within the other member and can be configured as the extension fitting into the rail or the rail fitting into the extension. The first rail 34 and the second rail 36 may include a plethora of apertures capable of receiving one or more retaining mechanisms. The first extension 30, the second extension 32, the first extension 40 and the second extension 42 may include apertures that align with apertures the first rail 34 and the second rail 36 to accept one or more fasteners. In other embodiments, the first extension 30, the second extension 32, the first extension 40 and the second extension 42 may be frictionally fitted inside the first rail 34 and the second rail 36 or the first rail 34 and the second rail 36 may be fitted inside the first extension 30, the second extension 32 the first extension 40, and the second extension 42. In yet another embodiment, the first extension 30, the second extension 32, the first extension 40 and the second extension 42 may be permanently attached to the first rail 34 and the second rail 36. The right cross member 28 includes a right attachment point 44 and the left cross member 38 includes a left attachment point 46. The right attachment 44 and the left attachment 46 may be connected to a pulley (not shown) or directly to the right winch cable and left winch cable respectively. The right cross member 28 is configured to slidably engage the first post 16c and the second post 18c to allow the right cross member 28 to slide from the right footer 14c to the right header 12c. In some embodiments, the right winch cable 22c is directly connected to the right cross member 28. In other embodiments, one or more pulleys are used to amplify the force. In these instances a first pulley may be attached to the right header 12c, the right cross member 28 or both the first header 12c and the right cross member 28. Similarly, the left winch cable 22*d* is directly connected to the left cross member 38. In other embodiments, one or more pulleys are used to amplify the force. In these instances a first pulley may be attached to the left header 12*d*, the left cross member 38 or both. This engagement mechanism may include rollers, tracks, bushing, slide plates, bushings or any other mechanism to allow the movement of the right cross member 28 up and down on the first post 16 and the second post 18. In addition, the first post 16 and the second post 18 may each include a plethora of apertures positioned from the right header 12*c* to the right footer 14*c* to receive a securing mechanism to limit the motion of the right cross member 28 when the final position is achieved. In addition, the right cross member 28 may include one or more apertures that align with the plethora of apertures to secure the right cross member 28 at a specific location on the first post 16 and the second post 18. The left cross member 38 is configured to slidably engage the first post 16*d* and the second post 18*d* to allow the left cross member 38 to slide from the left footer 14*d* to the left header 12*d*. In addition, the first post 16*d* and the second post 18*d* may each include a plethora of apertures positioned from the left header 12*d* to the left footer 14*d* to receive a securing mechanism to limit the motion of the left cross member 38 when the final position is achieved. In addition, the left cross member 38 may include one or more apertures that align with the plethora of apertures to secure the left cross member 38 at a specific location on the first post 16*d* and the second post 18*d*. The vehicle adapter 56 is configured to interact with first rail 34 and second rail 36. The vehicle adapter 56 includes a first region 50 separating a first rail attachment region 52 that includes a first channel 54 adapted to mate to the first rail 34 and a second rail attachment region 56 that includes a second channel 58 adapted to mate to the second rail 36. In operation, the vehicle adapter 56 will be used in pairs to accommodate a vehicle (not shown). The vehicle adapter 56 can be configured for specific types of vehicles, e.g. car, truck, boat, watercraft, motorcycle, or the like. When the vehicle (not shown) is an automobile, the vehicle adapter 56 will be used in pairs and spaced along the first rail 34 and the second rail 36 to accommodate the wheel spacing of the vehicle (not shown).

Figure 6:
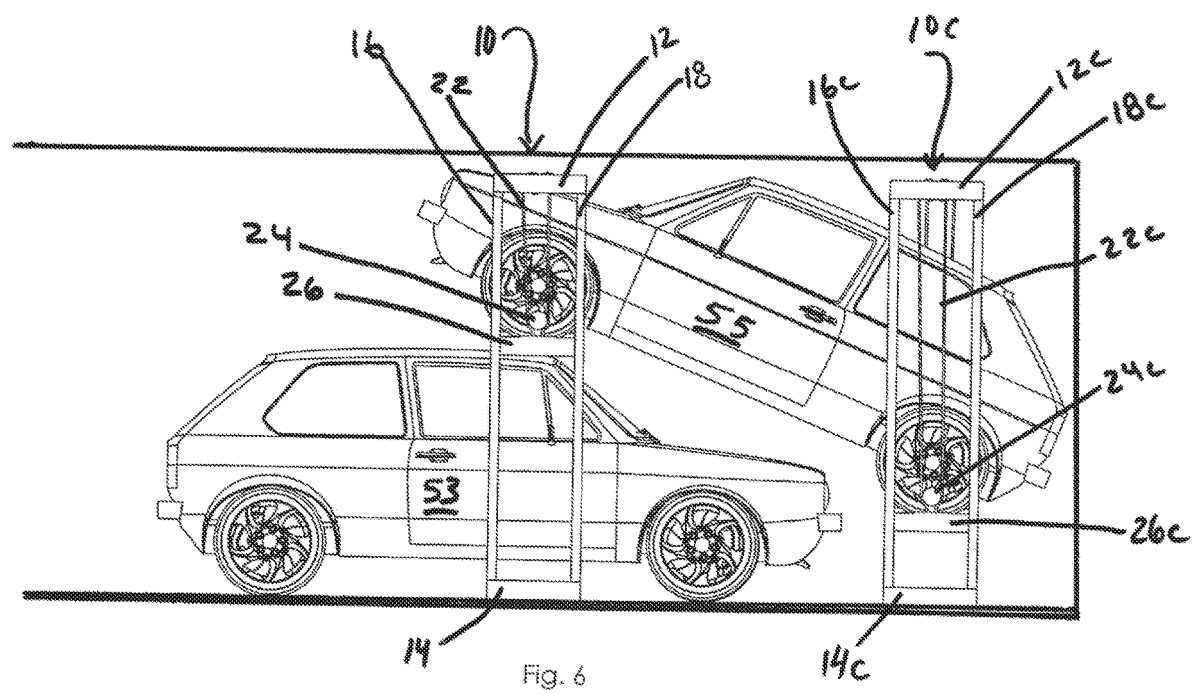
FIG. 6 is a side view of a front lift station and a rear lift station in use showing a first and second vehicle.

FIG. 6 is a side view of a front lift station having a left and right lift station and a rear lift station having a left and right lift station with a vehicle positioned thereon. The front lift station includes the right lift station 10 includes a right header 12 and a right footer 14 separated by a first post 16 and a second post 18. The right header 12 and the right footer 14 may be attached to the first post 16 and a second post 18 by any means known to the skilled artisan. This includes connecting the right header 12 and the right footer 14 may be attached to the first post 16 and a second post 18 with fasteners, removable bolts and nuts, pins, dowels, and the like. In another embodiment, the right header 12 and the right footer 14 may be attached to the first post 16 and a second post 18 may be frictionally fitted together in a locking manner that does not require fasteners. This includes a slot groove configuration or fitting the component into an aperture. In operation, the right header 12 and the first footer are inserted into a slot on the first post 16 and a second post 18 to secure the components. In another embodiment, the right header 12 and the right footer 14 have apertures that are adapted to fit the first post 16 and a second post 18 and mate to a tab or groove secure the components, fasteners may optionally be used. In addition, the right footer 14 may include an extension extending parallel to the floor to increase the contact area of the right footer 14 and the floor to increase stability. The right header 12 and the right footer 14 can be used to set the width separating the first post 16 and a second post 18 of the lift station 10 depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the right header 12 may be attached to the container sidewall (not shown) or the container ceiling (not shown). The right footer 14 may be connected to the container sidewall (not shown) or the container floor (not shown). In some embodiments the right header 12 may be connected to the container sidewall and the right footer 14 is connected to the container floor. A right header winch 20 is attached to header 12 such that the right winch cable 22 may extend towards the footer 14. The right header winch 20 may be attached to the right header 12 directly or may be attached to a removable mounting plate that connects to the right header 12. The right header winch 20 includes a right winch cable 22 that extends toward the right footer 14. A right header pulley 24 may be optionally attached to the right header 12 to allow the right winch cable 22 greater lifting and lowering capacity. The left lift station (not shown) includes a left header (not shown) and a left footer (not shown) separated by a first post (not shown) and a second post (not shown). The left header (not shown) and the left footer (not shown) may be attached to the first post (not shown) and a second post (not shown) by any means known to the skilled artisan. This includes connecting the left header (not shown) and the left footer (not shown) may be attached to the first post (not shown) and a second post (not shown) with fasteners, removable bolts and nuts, pins, dowels, and the like. In another embodiment, the left header (not shown) and the left footer (not shown) may be attached to the first post (not shown) and a second post (not shown) may be frictionally fitted together in a locking manner that does not require fasteners. This includes a slot groove configuration or fitting the component into an aperture. In operation, the left header (not shown) and the left footer (not shown) are inserted into a slot on the first post (not shown) and a second post (not shown) to secure the components. In another embodiment, the left header (not shown) and the left footer (not shown) have apertures that are adapted to fit the first post (not shown) and a second post (not shown) and mate to a tab or a groove secure the components, fasteners may optionally be used. In addition, the left footer (not shown) may include an extension extending parallel to the floor to increase the contact area of the left footer (not shown) and the floor to increase stability. The left header (not shown) and the left footer (not shown) can be used to set the width separating the first post (not shown) and a second post (not shown) of the left lift station (not shown) depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12 and the right footer 14 can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the left header (not shown)

may be attached to the container sidewall (not shown) or the container ceiling (not shown). The left footer (not shown) may be connected to the container sidewall (not shown) or the container floor (not shown). In some embodiments the left header (not shown) may be connected to the container sidewall and the left footer (not shown) is connected to the container floor. A left header winch (not shown) is attached to left header (not shown) such that the left winch cable (not shown) may extend towards the left footer (not shown). The left header winch (not shown) may be attached to the left header (not shown) directly or may be attached to a removable mounting plate that connects to the left header (not shown). The left header winch (not shown) includes a left winch cable (not shown) that extends toward the left footer (not shown). A left header pulley (not shown) may be optionally attached to the left header (not shown) to allow the left winch cable (not shown) greater lifting and lowering capacity. The crossbeam system 26 includes a right cross member 28 having a first extension 30 and a second extension 32. A first rail 34 connects to the first extension 30 and a second rail 36 connects to the second extension 32. A left cross member 38 includes a first extension 40 and a second extension 42 such that the first extension 40 connects to the first rail 34 and the second extension 42 connects to the second rail 36. The connection includes a slip fitting of one member within the other member and can be configured as the extension fitting into the rail or the rail fitting into the extension. The first rail 34 and the second rail 36 may include a plethora of apertures capable of receiving one or more retaining mechanisms. The first extension 30, the second extension 32, the first extension 40 and the second extension 42 may include apertures that align with apertures the first rail 34 and the second rail 36 to accept one or more fasteners. In other embodiments, the first extension 30, the second extension 32, the first extension 40 and the second extension 42 may be frictionally fitted inside the first rail 34 and the second rail 36 or the first rail 34 and the second rail 36 may be fitted inside the first extension 30, the second extension 32 the first extension 40, and the second extension 42. In yet another embodiment, the first extension 30, the second extension 32, the first extension 40 and the second extension 42 may be permanently attached to the first rail 34 and the second rail 36. The right cross member 28 includes a right attachment point 44 and the left cross member 38 includes a left attachment point 46. The right attachment 44 and the left attachment 46 may be connected to a pulley (not shown) or directly to the right winch cable and left winch cable respectively. The right cross member 28 is configured to slidably engage the first post 16 and the second post 18 to allow the right cross member 28 to slide from the right footer 14 to the right header 12. In some embodiments, the right winch cable 22 is directly connected to the right cross member 28. In other embodiments, one or more pulleys are used to amplify the force. In these instances a first pulley may be attached to the right header 12, the right cross member 28 or both the first header 12 and the right cross member 28. Similarly, the left winch cable (not shown) is directly connected to the left cross member 38. In other embodiments, one or more pulleys are used to amplify the force. In these instances a first pulley may be attached to the left header (not shown), the left cross member 38 or both the first header 12 and the left cross member 38. This engagement mechanism may include rollers, tracks, bushing, slide plates, bushings or any other mechanism to allow the movement of the right cross member 28 up and down on the first post 16 and the second post 18. In addition, the first post 16 and the second post 18 may each include a plethora of apertures positioned from the right header 12 to the right footer 14 to receive a securing mechanism to limit the motion of the right cross member 28 when the final position is achieved. In addition, the right cross member 28 may include one or more apertures that align with the plethora of apertures to secure the right cross member 28 at a specific location on the first post 16 and the second post 18. The left cross member 38 is configured to slidably engage the first post (not shown) and the second post (not shown) to allow the left cross member 38 to slide from the left footer (not shown) to the left header (not shown). In addition, the first post (not shown) and the second post (not shown) may each include a plethora of apertures positioned from the left header (not shown) to the left footer (not shown) to receive a securing mechanism to limit the motion of the left cross member 38 when the final position is achieved. In addition, the left cross member 38 may include one or more apertures that align with the plethora of apertures to secure the left cross member 38 at a specific location on the first post (not shown) and the second post (not shown). The vehicle adapter 56 is configured to interact with first rail 34 and second rail 36. The vehicle adapter 56 includes a first region 50 separating a first rail attachment region 52 that includes a first channel 54 adapted to mate to the first rail 34 and a second rail attachment region 56 that includes a second channel 58 adapted to mate to the second rail 36. In operation, the vehicle adapter 56 will be used in pairs to accommodate a vehicle (not shown). The vehicle adapter 56 can be configured for specific types of vehicles, e.g. car, truck, boat, watercraft, motorcycle, or the like. When the vehicle (not shown) is an automobile, the vehicle adapter 56 will be used in pairs and spaced along the first rail 34 and the second rail 36 to accommodate the wheel spacing of the vehicle (not shown). The rear lift station 62 includes the right lift station 10c includes a right header 12c and a right footer 14c separated by a first post 16c and a second post 18c. The right header 12c and the right footer 14c may be attached to the first post 16c and a second post 18c by any means known to the skilled artisan. This includes connecting the right header 12c and the right footer 14c may be attached to the first post 16c and a second post 18c with fasteners, removable bolts and nuts, pins, dowels, and the like. In another embodiment, the right header 12c and the right footer 14c may be attached to the first post 16c and a second post 18c may be frictionally fitted together in a locking manner that does not require fasteners. This includes a slot groove configuration or fitting the component into an aperture. In operation, the right header 12c and the first footer 14c are inserted into a slot on the first post 16c and a second post 18c to secure the components. In another embodiment, the right header 12c and the right footer 14c have apertures that are adapted to fit the first post 16c and a second post 18c and mate to a tab or groove secure the components, fasteners may optionally be used. In addition, the right footer 14c may include an extension extending parallel to the floor to increase the contact area of the right footer 14c and the floor to increase stability. The right header 12c and the right footer 14c can be used to set the width separating the first post 16c and a second post 18c of the lift station 10c depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The right header 12c and the right footer 14c can be used to set the width separating first post 16c and second post 18c and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the right header 12*c* may be attached to the container sidewall (not shown) or the container ceiling (not shown). The right footer 14*c* may be connected to the container sidewall (not shown) or the container floor (not shown). In some embodiments the right header 12*c* may be connected to the container sidewall and the right footer 14*c* is connected to the container floor. A right header winch 20*c* is attached to header 12*c* such that the right winch cable 22*c* may extend towards the footer 14*c*. The right header winch 20*c* may be attached to the right header 12*c* directly or may be attached to a removable mounting plate that connects to the right header 12*c*. The right header winch 20*c* includes a right winch cable 22*c* that extends toward the right footer 14*c*. A right header pulley 24*c* may be optionally attached to the right header 12*c* to allow the right winch cable 22*c* greater lifting and lowering capacity. The left lift station (not shown) includes a left header (not shown) and a left footer (not shown) separated by a first post (not shown) and a second post (not shown). The left header (not shown) and the left footer (not shown) may be attached to the first post (not shown) and a second post (not shown) by any means known to the skilled artisan. This includes connecting the left header (not shown) and the left footer (not shown) may be attached to the first post (not shown) and a second post (not shown) with fasteners, removable bolts and nuts, pins, dowels, and the like. In another embodiment, the left header (not shown) and the left footer (not shown) may be attached to the first post (not shown) and a second post (not shown) may be frictionally fitted together in a locking manner that does not require fasteners. This includes a slot groove configuration or fitting the component into an aperture. In operation, the left header (not shown) and the left footer (not shown) are inserted into a slot on the first post (not shown) and a second post (not shown) to secure the components. In another embodiment, the left header (not shown) and the left footer (not shown) have apertures that are adapted to fit the first post (not shown) and a second post (not shown) and mate to a tab or a groove secure the components, fasteners may optionally be used. In addition, the left footer (not shown) may include an extension extending parallel to the floor to increase the contact area of the left footer (not shown) and the floor to increase stability. The left header (not shown) and the left footer (not shown) can be used to set the width separating the first post (not shown) and a second post (not shown) of the left lift station (not shown) depending on the type and dimensions of the cargo and or cargo container for example the assembly dimensions may be 24-25 inches but widths from 6 inches to 36 inches may be used, e.g., 8-10 inches, 12-13 inches, 16-18 inches or 27-28 inches and shorter widths are also acceptable. The left header (not shown) and the left footer (not shown) can be used to set the width separating first post 16 and second post 18 and may be 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. In some embodiments the left header (not shown) may be attached to the container sidewall (not shown) or the container ceiling (not shown). The left footer (not shown) may be connected to the container sidewall (not shown) or the container floor (not shown). In some embodiments the left header (not shown) may be connected to the container sidewall and the left footer (not shown) is connected to the container floor. A left header winch (not shown) is attached to left header (not shown) such that the left winch cable (not shown) may extend towards the left footer (not shown). The left header winch (not shown) may be attached to the left header (not shown) directly or may be attached to a removable mounting plate that connects to the left header (not shown). The left header winch (not shown) includes a left winch cable (not shown) that extends toward the left footer (not shown). A left header pulley (not shown) may be optionally attached to the left header (not shown) to allow the left winch cable (not shown) greater lifting and lowering capacity. The crossbeam system 26 includes a right cross member 28 having a first extension 30 and a second extension 32. A first rail 34 connects to the first extension 30 and a second rail 36 connects to the second extension 32. A left cross member 38 includes a first extension 40 and a second extension 42 such that the first extension 40 connects to the first rail 34 and the second extension 42 connects to the second rail 36. The connection includes a slip fitting of one member within the other member and can be configured as the extension fitting into the rail or the rail fitting into the extension. The first rail 34 and the second rail 36 may include a plethora of apertures capable of receiving one or more retaining mechanisms. The first extension 30, the second extension 32, the first extension 40 and the second extension 42 may include apertures that align with apertures the first rail 34 and the second rail 36 to accept one or more fasteners. In other embodiments, the first extension 30, the second extension 32, the first extension 40 and the second extension 42 may be frictionally fitted inside the first rail 34 and the second rail 36 or the first rail 34 and the second rail 36 may be fitted inside the first extension 30, the second extension 32 the first extension 40, and the second extension 42. In yet another embodiment, the first extension 30, the second extension 32, the first extension 40 and the second extension 42 may be permanently attached to the first rail 34 and the second rail 36. The right cross member 28 includes a right attachment point 44 and the left cross member 38 includes a left attachment point 46. The right attachment 44 and the left attachment 46 may be connected to a pulley (not shown) or directly to the right winch cable and left winch cable respectively. The right cross member 28 is configured to slidably engage the first post 16*c* and the second post 18*c* to allow the right cross member 28 to slide from the right footer 14*c* to the right header 12*c*. In some embodiments, the right winch cable 22*c* is directly connected to the right cross member 28. In other embodiments, one or more pulleys are used to amplify the force. In these instances a first pulley may be attached to the right header 12*c*, the right cross member 28 or both the first header 12*c* and the right cross member 28. Similarly, the left winch cable (not shown) is directly connected to the left cross member 38. In other embodiments, one or more pulleys are used to amplify the force. In these instances a first pulley may be attached to the left header (not shown), the left cross member 38 or both. This engagement mechanism may include rollers, tracks, bushing, slide plates, bushings or any other mechanism to allow the movement of the right cross member 28 up and down on the first post 16 and the second post 18. In addition, the first post 16 and the second post 18 may each include a plethora of apertures positioned from the right header 12*c* to the right footer 14*c* to receive a securing mechanism to limit the motion of the right cross member 28 when the final position is achieved. In addition, the right cross member 28 may include one or more apertures that align with the plethora of apertures to secure the right cross member 28 at a specific location on the first post 16 and the second post 18. The left cross member 38 is configured to slidably engage the first post (not shown) and the second post (not shown) to allow the left cross member 38 to slide from the left footer (not shown) to the left header (not shown). In addition, the first post (not shown) and the second post (not shown) may each include a plethora of apertures positioned from the left header (not shown) to the left footer (not shown) to receive a securing mechanism to limit the motion of the left cross member 38 when the final position is achieved. In addition, the left cross member 38 may include one or more apertures that align with the plethora of apertures to secure the left cross member 38 at a specific location on the first post (not shown) and the second post (not shown). The vehicle adapter 56 is configured to interact with first rail 34 and second rail 36. The vehicle adapter 56 includes a first region 50 separating a first rail attachment region 52 that includes a first channel 54 adapted to mate to the first rail 34 and a second rail attachment region 56 that includes a second channel 58 adapted to mate to the second rail 36. In operation, the vehicle adapter 56 will be used in pairs to accommodate a vehicle (not shown). The vehicle adapter 56 can be configured for specific types of vehicles, e.g. car, truck, boat, watercraft, motorcycle, or the like. When the vehicle (not shown) is an automobile, the vehicle adapter 56 will be used in pairs and spaced along the first rail 34 and the second rail 36 to accommodate the wheel spacing of the vehicle (not shown).

FIG. 6 is a side view of a front lift station having a left and right lift station and a rear lift station having a left and right lift station with a vehicle positioned thereon. The front and the rear crossbeam system may be individually positioned at any point on the front and rear lift stations to provide the desired headspace for the vehicle being transported. In some instances, the front and the rear crossbeam will be placed above the midway point of the front and rear lift stations to elevate the front and the rear of the vehicle at the same height. In another embodiment, the front crossbeam system will be elevated on the pair of front lift stations to the maximum height allowed by the height if the container and the vehicle. The rear crossbeam system can then be elevated on the rear lift stations to a height that maximizes the loading space above and below the crossbeam systems. This configuration maximizes the storage space allowing a first vehicle to be position at an angle allowing a second vehicle to be positioned under the first vehicle without contacting. The angle of the first vehicle 55 may be 10, 20, 25, 30, 35, 40, 45, 50, 55, 60, 65, 70, 75, and any incremental variation thereof 46, 47, 48, 49, 45.8, etc. As seen in FIG. 6, the first vehicle 55 is positioned by moving the front left and right lift station to a height that allows the second vehicle 53 to move under the first vehicle 55. The rear lift station is moved upwardly to accommodate the second vehicle 53. The front and rear crossbeam system may be locked at the desired height to protect the first vehicle 55 to move under the second vehicle 53. In the simplest embodiment, the control unit (not shown) is connected to one or more wench motors of via a connector and one or more sensors. A controller is in communication with the control unit to individually control the one or more wench motors and receive data from the sensors. Power is supplied to the control unit via a power distribution unit, which also can supply power to the one or more winch motors. The connections may be prewired inside the container to allow a single external connection to the container from an outside source to supply the power to the components. In other embodiment, the power source may be a battery or a generator that can be engaged to power the power distribution unit. In other embodiments, the power distribution unit may be connected to a vehicle or dock equipment to derive power therefrom. The one or more winches are connected to the power and to the control unit so that the control unit may operate each of the one or more winch motors. The control unit is connected to a power source provided by an internal battery. For example, the one or more winch motors may be connected to an external power supply while the control unit is powered by an internal or external battery (rechargeable or replaceable). The controller is in communication with the control unit via a wireless link or wired connection. The controller functions to operate the connected components (e.g., one or more winch motors) and to inform the status of the sensors. This may be done by graphics or by simple lights and indicators. For example, the controller may be a tablet wirelessly connected to the control unit. The controller displays a graphic of the container frame, its position and the winch motor status. Alternatively, the graphic may list the motor status and frame position. The controller also provides activation buttons for the activation and direction of the winch motors. Alternatively, the controller may be a wired unit containing switches and lights to indicate status, position, direction etc. and allows the operation to be controlled. For example, in one embodiment the controller displays (via a graphic interface) the wench connected to the control unit and the selectable operation of the wench to retract and extend the wench line. The control module for the selected peripheral device can then be used to control that peripheral device. The control unit for the drive motor of the wench can be activated to operate the drive motor of the wench in the forward or reverse direction depending on the selected user input on the controller. The selected user input is then sent to the control unit which activates a motor control module to convert the input signal into a signal to the drive motor of the wench thus activating the drive motor of the wench. Information from the drive motor of the wench is also sent back to the control unit and transmitted to the controller to display the status of the drive motor of the wench and/or the distance moved by then activation. The wench motor may be deactivated by a signal from the controller, a sensor, or a safety switch. For example, the controller may be used winch a vehicle onto the frame or lift the frame. Once the vehicle is at the correct position the winch motor may be deactivated manually or by a sensor detects the position and deactivates winch motor.

Figure 7:
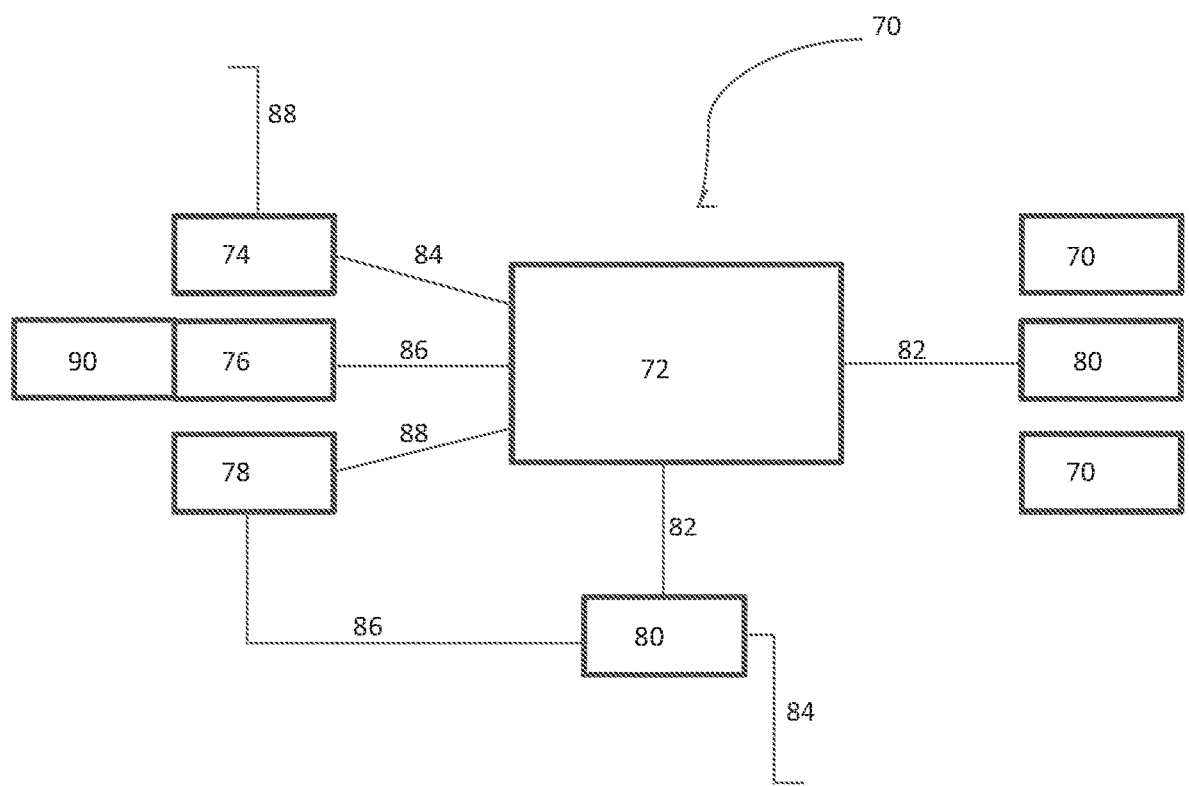
FIG. 7 is a schematic diagram illustrating a universal control console which embodies features of the invention operating with a plurality of devices.

FIG. 7 presents a diagram 70 illustrating the relationship between the control unit 72, the peripheral devices 74, 76 or 78 and the controller 80. The peripheral devices 74, 76 or 78 may be any device that can connect to and controlled by the control unit 72. The controller 80 can be connected to the control unit 72 via a connector 82 or via a wireless connection. The peripheral devices 74, 76 or 78 include many individual devices, motors, sensors, actuators, etc. that may connect or communicate to the control unit 72 via connectors 84 and 86 or via wireless communication link 88. Many of the functions of the peripheral devices 74, 76 or 78 are controllable by the controller 80 through communication with the control unit 72. In the following illustration, wherever it is said that a device is connected to another device, it is understood that the term "connected" may also mean that they can be connected wirelessly without physically connected through wires or both. In most of the time, at least one device will be connected to and operational with the control unit 72. The control unit 72 may also have a bypass mode. The control unit 72 may interface with and control the functions of any one of the peripheral devices 74, 76 or 78 via the connector 84, 86, or 88. The controller 80 is in communication with the control unit 72 to activate one or more of the peripheral devices 74, 76 or 78.

For example, the peripheral devices 74, 76 or 78 may represent a temperature probe, lights, fans, pumps, dehumidifiers, motion detector, position sensor, motors, sensors, actuators, individual devices that may operate with the control unit 72 and the controller 80. These peripheral devices 74, 76 or 78 may serve various functions such as detecting the position of vehicles, the rail bar position, the angle of vehicle or the rail bar, the height of vehicle or the rail bar, the status of motors, the activate and deactivate motors, in both the vertical and horizontal planes. The controller 80 is connected to the control unit 72 via a connector 82 that may be a wired or wireless communication links. The controller 80 may be a smart phone, a computer, a tablet, a control unit, a remote control unit, a set of buttons or switches, etc.

For example, in one embodiment the controller 80 is in communication with the control unit 72 to power on the peripheral devices 74 which is a wench motor. The user may operate the controller 80 to activate the wench motor to retract the wench cable and pull a vehicle onto the rail system. The controller 80 then instructs the control unit 72 to activate the wench motor 74 to retract the wench cable and pull a vehicle onto the rail system. The control unit 72 may stop the retraction of the cable via a signal from the controller 80 or through the indication by a sensor. In operation, the controller 80 is in communication with the control unit 72 which transmits instructions to the peripheral device 74 to activate that particular device as instructed by the controller 80. The connections to the controller 80 and the peripheral devices 74, 76 or 78 may be wired or wireless. Alternately, the control unit 72, the controller 80 or both may include a microprocessor-based electrical device with built-in software functions necessary to operate various peripheral devices 74, 76 or 78. The control unit 72, the controller 80 or both may store information in a memory device that including software script, stored for operating that particular peripheral devices 74, 76 or 78. For example, the said software script may be stored in non-volatile memories such as erasable programmable read only memories (EPROMs), electrically erasable programmable read only memories (EEPROMs) or flash memories. When the peripheral devices 74, 76 or 78 are connected to the control unit 72, this software script can be downloaded into the random access memory (RAM) of the control unit 72. This software script will enable the control unit 72 to control the functionalities of the particular peripheral devices 74, 76 or 78 and to display its pertinent information. During the operation of a peripheral device, the control unit 72, the controller 80 or both may use a Graphical User Interface (GUI) software to display information relevant to the operation of the control unit 72 and the peripheral devices 74, 76 or 78 to the operator. It is understood by those skilled in the art that the information displayed may vary depending upon the type of device connected, the operational state of the medical device as well as other environmental factors affecting the operation of both the device and the control unit 72. It is understood that although traditionally the peripheral devices 74, 76 or 78 are connected to the control unit 72 through wired connections for their operations, the control of the devices by the control unit 72 can be easily implemented through wireless communications.

The conventional wired connections have certain advantages such as low signal interferences, but the wireless technology can turn the operation of the device to mobile operation, which benefits the operator as well. For example, other than the power output provided by the control unit 72, almost all the control signals can be sent through a predetermined wireless communication channel using technologies such as Bluetooth or 802.11 compliant wireless technologies. Similarly, analog signals used in the communications can be replaced by digital signals if appropriate since the digital signal processing technology has also advanced. In short, while the present disclosure only provides some examples for illustrating the inventions, it should be understood that communications between devices can take various forms and the control unit 72 is designed to use the most practical technologies for fulfilling the need of the operators. The control unit 72 is in communication with a power distribution unit 80, which connects, via a line cord 82, the control unit 72 to an electrical power source 84, such as a 100-120V AC or a 220-240V AC power source. A line cords 86 may also be used to deliver electrical power from the power distribution unit 80 to the peripheral device 78. Alternatively, one or more of the peripheral device 74 may be directly connected to the electrical power source via a line cord 88. Similarly, the peripheral device 46 may be powered by an internal or external battery 90.

Figure 8:
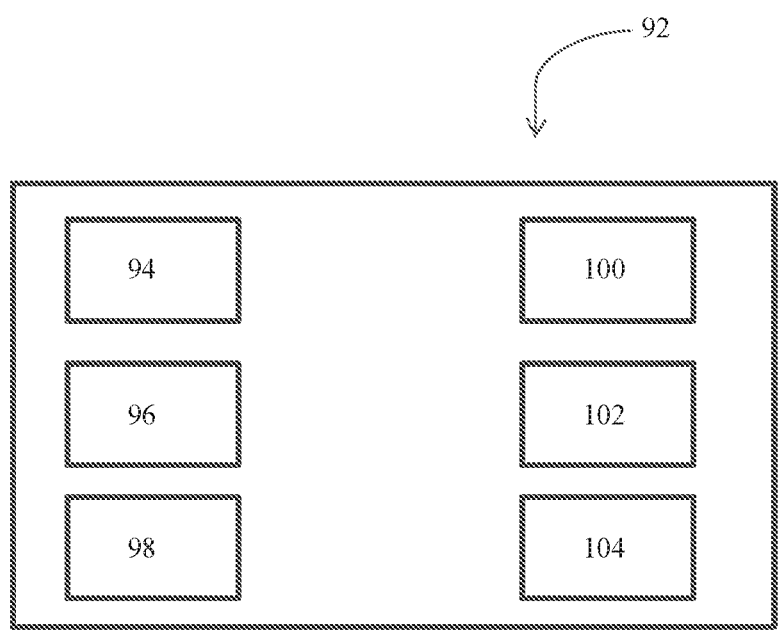
FIG. 8 illustrates the major components of the universal control console.

FIG. 8 illustrates several components 92 of the current invention that are stored on the control unit (not shown) and or the controller (not shown) depending on the specific configuration. In some embodiments, the components 92 are stored locally on the control unit (not shown) but in other embodiments the components 92 are stored in the controller (not shown). The components 92 include a graphics module 94, a microprocessor module 96, a software module 98, and an operator module 82. Some components 92 must be stored in the control unit (not shown), e.g., a hardware interface module 100 and a power module 104. The graphics module 94 may include a display or monitor to display information relevant to the operation of the control unit (not shown) and peripheral devices (not shown). The graphics module 94 may also require a piece of Graphical User Interface (GUI) software that is used to display all pertinent information to the operator. The microprocessor module 96 may include microprocessors, motherboard circuitries, memories and other functional electronic devices that enable the control unit (not shown), the operator controls thereof, the functions of the peripheral devices (not shown). It may also interface with an external computer via an external computer interface connector for system troubleshooting, software upgrade, and other shop functions. The software module 98 controls the logical and interface functions of the control unit (not shown), the logical and interface functions of the peripheral devices (not shown) attached thereto, and the operator control switches therein. The software module 98 may also generate various control signals such as audible tones (for example, sounds of Bong, Click, and Alarm) that are applied to a speaker located within the control unit (not shown). The Bong and Click tones may be adjustable by a predetermined setting. Depending on software specification, the alarm tone may or may not be adjustable. Specifically, the software module 96 may include any combination of the following: core software operating the control unit (not shown), GUI software for presenting graphics in the graphics module 94, built-in self-test (BIST) software, and software for controlling and interfacing with the peripheral devices (not shown) and the controller (not shown). The software script will allow for the control of the particular peripheral device (not shown) functions and display its pertinent information. The hardware interface module 100 may include circuitries and connecting modules necessary to allow peripheral devices (not shown and/or the controller (not shown) to be connected to the control unit (not shown). These connecting modules may be general connectors compliant with various well-known standards, including but not limited to Institute of Electrical and Electronics Engineers (IEEE) standards and International Organization of Standardization (ISO)

standards. These connectors may also be proprietary connectors specific to a particular peripheral device (not shown). In addition, the connecting modules may be a circuitry for communicating wirelessly with a controller (not shown) by the control unit (not shown). For example, the hardware interface module 100 may have a computer interface connector. In another example, the hardware interface module 100 may have an AC power input connector, which may be a wire connector connectable to 100-120 or 220-240 VAC and/or 12-36 VDC. In yet another example, the hardware interface module 100 may have an AC power output connector, which is connectable to other peripheral devices (not shown) to provide AC power. In yet another example, the hardware interface module 100 may have a DC power output connector, which is connectable to other peripheral devices (not shown) to provide DC power. It is understood that either DC or AC power can be delivered to the peripheral devices (not shown). Other hardware interface circuitry and connectors implemented into the control unit (not shown) may depend upon the peripheral devices (not shown). Since analog and digital signals may co-exist in various operations, the control unit (not shown) may have analog-to-digital (A/D) converters or even digital-to-analog (D/A) converters contained therein for processing various signals coming in or going out from the control unit (not shown). The operator module 92 may include various pushbutton switches and indicators that assist the operator to operate the control unit (not shown) locally. For example, there may be operator pushbutton switches or toggle switches. The power module 104 may include a transformer, AC power input and output connectors, a power system, fuse, and a power switch. The power module 94 may supply power to the rest of the control unit (not shown), and may supply power to the peripheral devices (not shown) and/or the controller (not shown).

Figure 9:
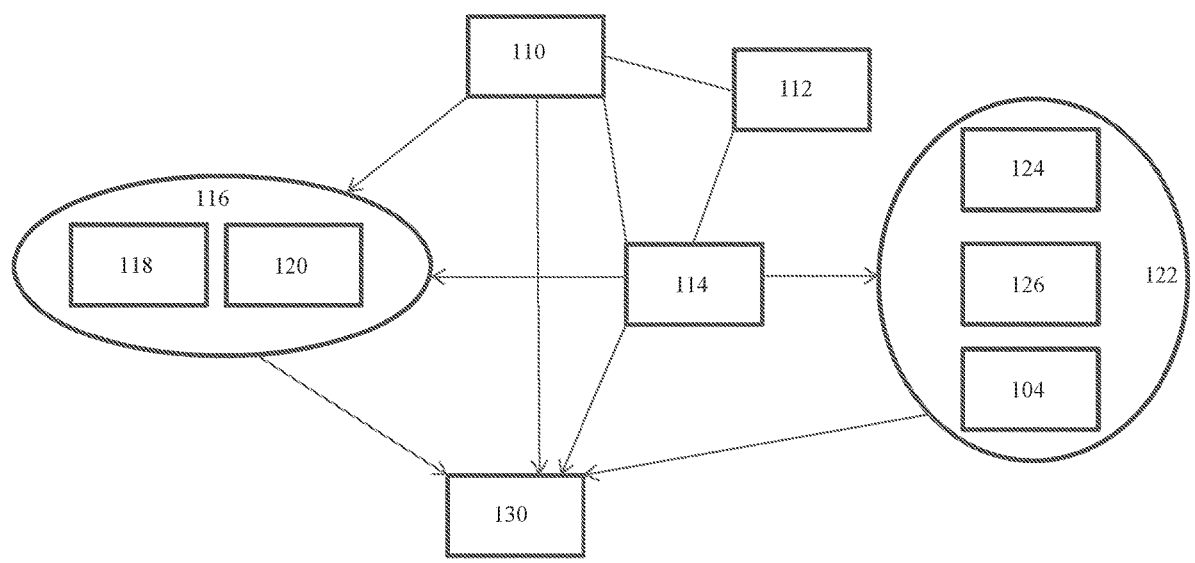
FIG. 9 illustrates a flowchart illustrating an interactivity between various software components of the universal control console embodying features of the invention.

FIG. 9 presents a flowchart illustrating the interactivity between various software components of the control unit (not shown) in accordance with one example of the present invention. The components include a main module 110, a device code module 112, an application program interface (API) module 114, a core software module 116 that in turn includes a self-test module 118 and a GUI module 120, a control software module 122 that in turn includes a communication control module 124, a motor control modules 126 and a RF control module 128, and a binary I/O module 130. The main module 110 contains software functions for the operation. For example, it includes a reset function in assembly code that is required to start the controller and run a portion of the self-test. The main module 110 also includes a high-level code that runs the main loop and performs additional self-tests, including memory and processor tests. The device-code module 88 loads the device code from nonvolatile memories into the code buffer of the volatile memories and then runs tests thereon. The device code may be tested by a variety of methods. For example, one device code testing method is by using cyclic redundancy check (CRC). The device-code module 112 may also allow the control unit (not shown) to write to nonvolatile memories. Another functionality of the device-code module 112 may include the testing of nonvolatile memories. In other words, the device-code module 112 may run periodic tests to ensure that nonvolatile memories are not corrupted. The API module 114 may include an API called by the device code, and an API manager that is used to manage the said API. The API is used by the device-code module 112 to request the control unit (not shown) to act in a certain manner. As an example, one implementation strategy may call for the use of software interrupts to request certain API routines, via the API module 114. The self-test module 118 may include built-in, self-test (BIST) software that is used to perform various self-testing operations. Most of these self-testing operations should be non-invasive, i.e., they should test for misconfiguration, but should not actively induce one. The GUI module 120 may include software that is used to draw outputs to the screen. The communication control module 100 may include software that controls the inputs and outputs connector. The communication control module 124 keeps all information about a port in a table, which is typically indexed to ensure fast referencing. The interrupt callback routines of the communication control module 124 may be passed to a hardware access layer, thereby enabling the control unit (not shown) to receive incoming data. The motor control module 126 may include software that controls numerous motors located in the peripheral devices (not shown). The motor control module 126 may provide the control unit (not shown) with various operating modes. For example, the motor control module 126 may provide a feedback-controlled operating mode, which may employ a variety of discrete proportional-integral-derivative (PID) feedback algorithms to provide feedback functionality. The motor control module 102 may also provide various constant operating modes, including constant current and constant voltage operating modes, which may be necessary for peripheral devices (not shown). The RF control module 104 is dedicated to control devices using RF energy and may be in any form currently being implemented including Wi-Fi, Bluetooth and other standard communication protocols. The binary I/O module 130 may include software that performs the binary input and output. For example, the binary I/O module 130 maps an array of binary outputs to its corresponding array of hardware address registers, and writes data flags to the latter. For example, when the "power-off" button is pressed, the binary I/O module 130 first searches for and locates the corresponding hardware address register, and then begins a power-off sequence. In another example, when a motor is stopped, the binary I/O module 130 may read the corresponding hardware address and return a flag indicating that the particular motor has been stopped.

In the simplest embodiment, the control unit (not shown) is connected to a drive motor of the wench via a connector and connector to a tablet controller. A power distribution unit is connected to the tablet controller via a line cord to deliver electrical power from a source to the control unit. The drive motor of the wench is connected to a power source via the line cord and the tablet controller is connected to a power source provided by an internal battery. The tablet controller is in communication with the control unit via a wireless link. The tablet controller displays via a graphic interface of the wench connected to the control unit and the selectable operation of the wench to retract or extend the wench line. The control module for the selected peripheral device can then be used to control that peripheral device. The control unit for the drive motor of the wench can be activated to operate the drive motor of the wench in the forward or reverse direction depending on the selected user input on the tablet controller. The selected user input is then sent to the control unit which activates a motor control module to convert the input signal into a signal to the drive motor of the wench thus activating the drive motor of the wench. Information from the drive motor of the wench is also sent back to the control unit and transmitted to the tablet controller to display the status of the drive motor of the wench and/or the distance moved by then activation. The wench motor may be deactivated by a signal from the tablet controller, a sensor, or a safety switch. The tablet controller may display a graphic of the position and/or the status of the winch.

In operation the rear lift station having a left and right lift station is positioned in the container and optionally secured to the floor, wall, and/or ceiling. The front lift station having a left and right lift station is positioned in the container a distance from the rear lift station that corresponds to the wheelbase of the vehicle and optionally secured to the floor, wall, and/or ceiling. For each lift station, this is be done by positioning the footer at the desired location and connecting the first and second posts to the footer. The header is then attached to the first and second posts. The winch and/or the header pulley may be attached to the header before or after header installation. The first post and the second post may be separated by any distance from 4 inches to 36 inches depending on the vehicle, e.g., 6-9 inches, 8-10 inches, 9-13 inches, 12-14 inches, 13-15 inches, 16-18 inches, 18-20 inches, 20-24 inches, 24-26 inches or 27-28 inches and shorter widths are also acceptable. The header and the footer can be used to set the width separating first post and second post to 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, or greater. Once the pair of left and right lift stations are positioned the crossbeam system is positioned in movable contact with the first post and the second post. The first rail and the second rail are connected to the right cross member. The left cross member is then connected to the first rail and the second rail. The crossmembers and first rail and the second rail may be slid into each other and then optionally secured with fasteners to lock the crossbeam system. The right and left crossmembers are connected to the first post and the second post such that the crossbeam system will move up and down the first post and the second post. In some embodiments, the first post and the second post will have securing means that lock the movement of the crossmembers to limit the downward movement of the crossmembers. In addition, the crossmembers may include an optionally attached a pulley. This procedure is repeated at the front and the rear lift stations. Then each winch cable is directly attached to the crossmember or fed through the pulley or pulleys and secured. This procedure is repeated at each pair of left and right lift stations. In some instances, the left and right lift stations are connected to a single winch through a pulley or cable to allow the front crossbeam system to move in unison; the same configuration may be used in the front or rear lift station pairs. The front pair of vehicle adapters are attached to span from the first rail and the second rail at the position of the front tires. The rear pair of vehicle adapters are attached to span from the first rail and the second rail at the position of the rear tires. For each winch, the winch power line is attached to the winch and connected to a power source. The winch connection may be connected to a control unit that communicates with a controller to operate the winches. In addition, the optional position sensor may be connected to the control unit. The securing means may be operably connected to the control unit to engage and disengage the securing means to allow lowering of the crossbeam system. The connection of the control unit to the controller may be wired or wireless. The vehicle adapter can be configured for specific types of vehicles, e.g. car, truck, boat, watercraft, motorcycle, or the like. With the front crossbeam system and the second crossbeam system in place and a vehicle in position on the front crossbeam system and the second crossbeam system the controller may be used to raise the front crossbeam system and the second crossbeam system to a height desired for the second crossbeam system. The first cross member system is then raised to the desired height given the height of the container and the height of the second vehicle. Once the first vehicle is in position the second vehicle may be positioned under the first vehicle. The angle of the front tires of the vehicle to the rear tires of the vehicle or the angle from the front crossmember to the rear crossmember may be any angel that will accommodate the vehicles to maximize space, e.g., 10, 20, 25, 30, 35, 40, 45, 50, 55, 60, 65, 70, 75, and any incremental variation thereof 46, 47, 48, 49, 45.8, 44.2, 45.9, 47.6 etc.

The present invention provides a device to load 4 cars in a container. The Cross Members use guided vertical posts for raising and lowering which keeps the cross-member level and allows for greater clearance from the bottom of the cross members to the floor of the container. The Cross Members telescoped on ends to accept different widths of containers. The present invention may used straps, bolts and nuts to secure system. The present invention may be made of Aluminum and Steel construction. The entire system may "snaps" or interlock together and can be reduced to 90" wide for shipping purposes. This fits directly into the container without the need for complicated loading methods. The present invention provides for Single Person Operation. The aluminum Cross Beams are extruded from a die that does not exist in the size used in our design. In addition the use of Laser Drilled Beams allow for "snap" fit and will be used for future accessories that will be offered for loading motorcycles, boats and other general cargo. Cross Members use roller guided vertical posts for raising and lowering which keeps the cross members level and wheels in place during raising and lowering and allows for greater clearance from the bottom of the cross members to the floor of the container once the vehicle is set to its raised height. UHMW is used in these areas of contact which is self-lubricating and highly abrasion resistant. Steel components are laser cut from sheet metal and pressed into shape. Use of wireless, electric hoists that are controlled by tablet or wireless remote to raise and lower vehicles. Keeps employees out of harm's way during loading and unloading. As used herein the term winch may also mean any electric Hoists or the use a double sheave pulley system which gives us a mechanical advantage (2:1, 3:1, 4:1 or greater) for raising and lowering the vehicles. Fall Arrest Safety System-Hoist drum will be modified to accept a secondary cable which is used to catch the load during raising and lowering should the primary cable become detached. Straps and spring-loaded locking pins are used to secure the system while lag bolts are used to secure the lower area of the vertical posts to the floor. Straps are sourced locally and are a standard ratchet design.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

What is claimed is:

1. A removable frame system for supporting a vehicle for transport comprising:

a front lift station comprising a first front lift station opposite a second front lift station, wherein the first front lift station comprises a first front header and a first front footer separated by one or more first front support posts; and a first front winch attached to the first front lift station, and wherein the second front lift station comprises a second front header and a second front footer separated by one or more second front support posts; and a second front winch attached to the second front lift station;

a front crossbeam system slidably connected to the first front lift station, wherein the front crossbeam system comprises a first front cross member connected to a second front cross member by a first front rail and a front second rail, wherein the first front cross member is retained and moves on the one or more first front support posts and the second front cross member is retained and moves on the one or more second front support posts;

a first front winch cable operably connected to the first front winch and to the first front cross member;

a second front winch cable operably connected to the second front winch and to the second front cross member to raise and lower the front crossbeam system;

a first front vehicle adaptor spanning the first front rail and the second front rail;

a second front vehicle adaptor spanning the first front rail and a second front rail;

a rear lift station positioned adjacent the front lift station, wherein the rear lift station comprises a first rear lift station opposite a second rear lift station, wherein the first rear lift station comprises a first rear header and a first rear footer separated by one or more first rear support posts; and a first rear winch attached to the first rear lift station, and wherein the second rear lift station comprises a second rear header and a second rear footer separated by one or more second rear support posts; and a second rear winch attached to the second rear lift station;

a rear crossbeam system slidably connected to the rear lift station, wherein the rear crossbeam system comprises a first rear cross member connected to a second rear cross member by a first rear rail and a second rear rail, wherein the first rear cross member is retained and moves on the one or more first rear support posts and the second rear cross member is retained and moves on the one or more second rear support posts;

a first rear winch cable operably connected to the first rear winch and to the first rear cross member;

a second rear winch cable operably connected to the second rear winch and to the second rear cross member to raise and lower the rear crossbeam system;

a first rear vehicle adaptor spanning the first rear rail and the second rear rail; and a second rear vehicle adaptor spanning the first rear rail and the second rear rail.

2. The removable frame system of claim 1, wherein the one or more first front support posts, one or more second front support posts, one or more first rear support posts, one or more second rear support posts each comprise a pair of support posts.

3. The removable frame system of claim 1, wherein the first front winch, the second front winch, the first rear winch, second rear winch are independently connected to the header, the footer or the one or more support posts.

4. The removable frame system of claim 1, wherein the first front winch, the second front winch, the first rear winch, second rear winch are independently remotely located.

5. The removable frame system of claim 1, further comprising a control unit connected to the first front winch, the second front winch, the first rear winch, and the second rear winch to operably control the first front winch, the second front winch, the first rear winch, and the second rear winch independently, in pairs or in unison.

6. The removable frame system of claim 5, wherein the control unit is connected wirelessly.

7. The removable frame system of claim 1, wherein the first front winch is linked to move in unison with the second front winch.

8. The removable frame system of claim 1, wherein the first rear winch is linked to move in unison with the second rear winch.

9. The removable frame system of claim 1, further comprising a power supply connected to the first front winch, the second front winch, the first rear winch, and the second rear winch.

10. The removable frame system of claim 1, further comprising a position sensor connected to the front crossbeam system, the rear crossbeam system or both to locate the position of the front crossbeam system, the rear crossbeam system or both.

11. The removable frame system of claim 1, further comprising a clearance sensor connected to the front lift station, the rear lift station or both to determine if the front crossbeam system, the rear crossbeam system or both are blocked.

12. The removable frame system of claim 1, further comprising a locking means connected to the first front lift station, the second front lift station, the first rear lift station, the second rear lift station or a combination thereof stop the downward motion of the front crossbeam system, the rear crossbeam system or both, wherein the locking means is a strap, a chain, a cable, a toothed gear configuration.

13. The removable frame system of claim 1, wherein the locking means is connected to the control unit to selectable engage the locking means.

14. The removable frame system of claim 1, further comprising one or more pulleys attached to the first front lift station, one or more pulleys operably connected to the attached to the second front lift station, and/or one or more pulleys attached to the first rear lift station and one or more pulleys attached to the second rear header.

15. A method of transporting a vehicle comprising the steps of providing a container;

installing a removable frame system for supporting a vehicle in the container, wherein the removable frame system comprises a front lift station comprising a first front lift station opposite a second front lift station, wherein the first front lift station comprises a first front header and a first front footer separated by one or more first front support posts; and a first front winch attached to the first front lift station, and wherein the second front lift station comprises a second front header and a second front footer separated by one or more second front support posts; and a second front winch attached to the second front lift station; a front crossbeam system slidably connected to the first front lift station, wherein the front crossbeam system comprises a first front cross member connected to a second front cross member by a first front rail and a front second rail, wherein the first front cross member is retained and moves on the one or more first front support posts and the second front cross member is retained and moves on the one or more second front support posts; a first front winch cable operably connected to the first front winch and to the first front cross member; a second front winch cable operably connected to the second front winch and to the second front cross member to raise and lower the front crossbeam system; a first front vehicle adaptor spanning the first front rail and the second front rail; a second front vehicle adaptor spanning the first front rail and a second front rail; a rear lift station positioned adjacent the front lift station, wherein the rear lift station comprises a first rear lift station opposite a second rear lift station, wherein the first rear lift station comprises a first rear header and a first rear footer separated by one or more first rear support posts; and a first rear winch attached to the first rear lift station, and wherein the second rear lift station comprises a second rear header and a second rear footer separated by one or more second rear support posts; and a second rear winch attached to the second rear lift station; a rear crossbeam system slidably connected to the rear lift station, wherein the rear crossbeam system comprises a first rear cross member connected to a second rear cross member by a first rear rail and a second rear rail, wherein the first rear cross member is retained and moves on the one or more first rear support posts and the second rear cross member is retained and moves on the one or more second rear support posts; a first rear winch cable operably connected to the first rear winch and to the first rear cross member; a second rear winch cable operably connected to the second rear winch and to the second rear cross member to raise and lower the rear crossbeam system; a first rear vehicle adaptor spanning the first rear rail and the second rear rail; and a second rear vehicle adaptor spanning the first rear rail and the second rear rail;

connecting a power supply to the first front winch, the second front winch, the first rear winch, and the second rear winch;

connecting a control unit to the power supply to control the first front winch, the second front winch, the first rear winch, and the second rear winch;

inserting a first vehicle into the container, wherein the vehicle comprises a vehicle front and a vehicle rear;

positioning the vehicle front on the first front vehicle adaptor and the second front vehicle adaptor;

positioning the vehicle rear on the first rear vehicle adaptor and the second rear vehicle adaptor;

engaging the control unit to operate the first front winch and the second front winch to raise the vehicle front;

engaging the control unit to operate the first rear winch and the second rear winch to raise the vehicle rear; wherein the location of the vehicle front relative to the vehicle rear form a lift angle of between 0 and 85 degrees.

16. The method of claim 15, further comprising the steps of locking the front crossbeam system and the rear crossbeam system in position.

17. The method of claim 15, wherein the first rail is parallel to the second rail and at an angle of between 25 and 90 degrees relative to the first pair of frame supports.

18. The method of claim 15, wherein the first rail is parallel to the second rail and at an angle of between 35 and 50 degrees relative to the first pair of frame supports.

19. The method of claim 15, wherein the container is a simple container, cargo container, freight container, ISO container, shipping container, sea container, ocean container, container van, CONEX® box, sea box, c can, a 53-foot container, intermodal container, or similar container.

20. A method of retrofitting a vehicle transport system comprising the steps of providing a front lift station comprising a first front lift station opposite a second front lift station, wherein the first front lift station comprises a first front header and a first front footer separated by one or more first front support posts;

connecting a first front winch to the first front lift station;

providing a second front lift station comprises a second front header and a second front footer separated by one or more second front support posts;

connecting a second front winch to the second front lift station;

providing a front crossbeam system slidably connected to the first front lift station and the second front lift station;

connecting a first front winch cable from the first front winch to the front crossbeam system;

connecting a second front winch cable from the second front winch to the front crossbeam system;

providing a rear lift station comprising a first rear lift station opposite a second rear lift station wherein the first rear lift station comprises a first rear header and a first rear footer separated by one or more first rear support posts;

connecting a first rear winch to the first rear lift station;

providing a second rear lift station comprises a second rear header and a second rear footer separated by one or more second rear support posts;

connecting a second rear winch to the second rear lift station;

providing a rear crossbeam system slidably connected to the first rear lift station and the second rear lift station;

connecting a first rear winch cable from the first rear winch to the rear crossbeam system;

connecting a second rear winch cable from the second rear winch to the rear crossbeam system;

connecting a power supply to the first front winch, the second front winch, the first rear winch, and the second rear winch to operably control the first front winch, the second front winch, the first rear winch, and the second rear winch;

connecting a control unit to the power supply;

connecting the control unit to the first front winch, the second front winch, the first rear winch, and the second rear winch to operably control the first front winch, the second front winch, the first rear winch, and the second rear winch independently, in pairs or in unison, wherein the control unit is wireless, wired or a combination of wired and wireless;

optionally connecting the control unit to one or more sensors; and optionally providing one or more rear vehicle adaptors spanning the front crossbeam system and one or more rear vehicle adaptors spanning the area crossbeam system.

* * * * *